(12) United States Patent
Straub

(10) Patent No.: US 11,487,514 B2
(45) Date of Patent: Nov. 1, 2022

(54) STATE MANAGEMENT PERSISTENCE

(71) Applicant: Oracle International Corporation, Redwood Shores, CA (US)

(72) Inventor: Christian Straub, Redwood City, CA (US)

(73) Assignee: Oracle International Corporation, Redwood Shores, CA (US)

( * ) Notice: Subject to any disclaimer, the term of this patent is extended or adjusted under 35 U.S.C. 154(b) by 80 days.

(21) Appl. No.: 16/003,023

(22) Filed: Jun. 7, 2018

(65) Prior Publication Data

US 2019/0095179 A1 Mar. 28, 2019

Related U.S. Application Data

(60) Provisional application No. 62/629,523, filed on Feb. 12, 2018, provisional application No. 62/629,526, (Continued)

(51) Int. Cl.
| | |
|---|---|
| *G06F 8/38* | (2018.01) |
| *G06F 3/0483* | (2013.01) |
| *G06F 9/451* | (2018.01) |
| *G06F 16/182* | (2019.01) |
| *G06F 16/955* | (2019.01) |
| *G06F 8/34* | (2018.01) |

(Continued)

(52) U.S. Cl.
CPC .............. *G06F 8/38* (2013.01); *G06F 3/0483* (2013.01); *G06F 8/34* (2013.01); *G06F 9/4493* (2018.02); *G06F 9/451* (2018.02); *G06F 16/182* (2019.01); *G06F 16/9566* (2019.01); *G06F 3/0486* (2013.01); *G06F 3/04817* (2013.01); *G06F 16/955* (2019.01)

(58) Field of Classification Search
CPC .. G06F 3/0483; G06F 3/04817; G06F 3/0486; G06F 9/4493; G06F 9/451; G06F 16/182; G06F 16/955; G06F 16/9566; G06F 8/34; G06F 8/38

See application file for complete search history.

(56) References Cited

U.S. PATENT DOCUMENTS

| | | | | |
|---|---|---|---|---|
| 4,764,867 | A | * 8/1988 | Hess ................... | G06F 16/9024 715/853 |
| 5,671,360 | A | * 9/1997 | Hambrick ...... | G06Q 10/063114 705/7.15 |

(Continued)

*Primary Examiner* — Ariel Mercado
*Assistant Examiner* — William Wong
(74) *Attorney, Agent, or Firm* — Trellis IP Law Group, PC

(57) ABSTRACT

A hierarchy of containers is received at a user interface of a design time tool. The hierarchy of containers includes a container nested inside of one or more other containers. Each of the containers includes a different part of a web client application. The design time tool associates state with each of the containers in the hierarchy of containers. Lifecycles for each of the containers are received at the user interface. The design time tool creates computer executable instructions in the web client application that enable state for each of the containers to be created and destroyed according to the hierarchy based on the respective lifecycles of each of the containers. The design time tool provides each of the containers access to its own state and state of containers that include it based on respective lifecycle events associated with each of the containers.

20 Claims, 24 Drawing Sheets

Related U.S. Application Data filed on Feb. 12, 2018, provisional application No. 62/564,945, filed on Sep. 28, 2017, provisional application No. 62/564,946, filed on Sep. 28, 2017.

(51) Int. Cl.
*G06F 9/448* (2018.01)
*G06F 3/04817* (2022.01)
*G06F 3/0486* (2013.01)

(56) References Cited

U.S. PATENT DOCUMENTS

| | | | | |
|---|---|---|---|---|
| 7,607,110 | B2 * | 10/2009 | McKeon | G06F 9/451 |
| | | | | 715/854 |
| 7,937,477 | B1 * | 5/2011 | Day | H04L 63/102 |
| | | | | 709/227 |
| 9,106,690 | B1 * | 8/2015 | Banga | H04L 63/1433 |
| 2002/0138582 | A1 * | 9/2002 | Chandra | G06Q 10/107 |
| | | | | 709/206 |
| 2002/0147857 | A1 * | 10/2002 | Sanchez, II | G06F 9/4493 |
| | | | | 719/316 |
| 2002/0174201 | A1 * | 11/2002 | Ramer | G06F 17/2241 |
| | | | | 709/220 |
| 2003/0018898 | A1 * | 1/2003 | Lection | G06F 21/6209 |
| | | | | 713/182 |
| 2003/0088593 | A1 * | 5/2003 | Stickler | G06F 16/40 |
| 2004/0095387 | A1 * | 5/2004 | Demsey | G06F 9/451 |
| | | | | 715/762 |
| 2005/0203958 | A1 * | 9/2005 | Mitchell | G06F 8/315 |
| 2007/0067727 | A1 * | 3/2007 | Jolley | G06F 9/451 |
| | | | | 715/742 |
| 2007/0073750 | A1 * | 3/2007 | Chand | G05B 19/056 |
| 2007/0233709 | A1 * | 10/2007 | Abnous | G06F 21/629 |
| 2007/0244846 | A1 * | 10/2007 | Jolley | G06F 16/954 |
| | | | | 706/48 |
| 2008/0263565 | A1 * | 10/2008 | Luther | G06F 16/2358 |
| | | | | 719/316 |
| 2009/0144695 | A1 * | 6/2009 | Vairavan | G06F 8/20 |
| | | | | 717/105 |
| 2012/0030577 | A1 * | 2/2012 | Akolkar | G06F 3/0484 |
| | | | | 715/738 |
| 2015/0074743 | A1 * | 3/2015 | Ilieva | H04L 63/20 |
| | | | | 726/1 |
| 2018/0349150 | A1 * | 12/2018 | Wong | G06F 9/4493 |

\* cited by examiner

FIGURE 1

ORACP0208

```
100  101       102            103
 |    |         |              |
/SaaSCloud/Financials/ExpenseReports -- 110

100  101       122            123
 |    |         |              |
/SaaSCloud/HumanResources/Employee --120

100  101       102           133
 |    |         |              |
/SaaSCloud/Financials/Receipts--130
```

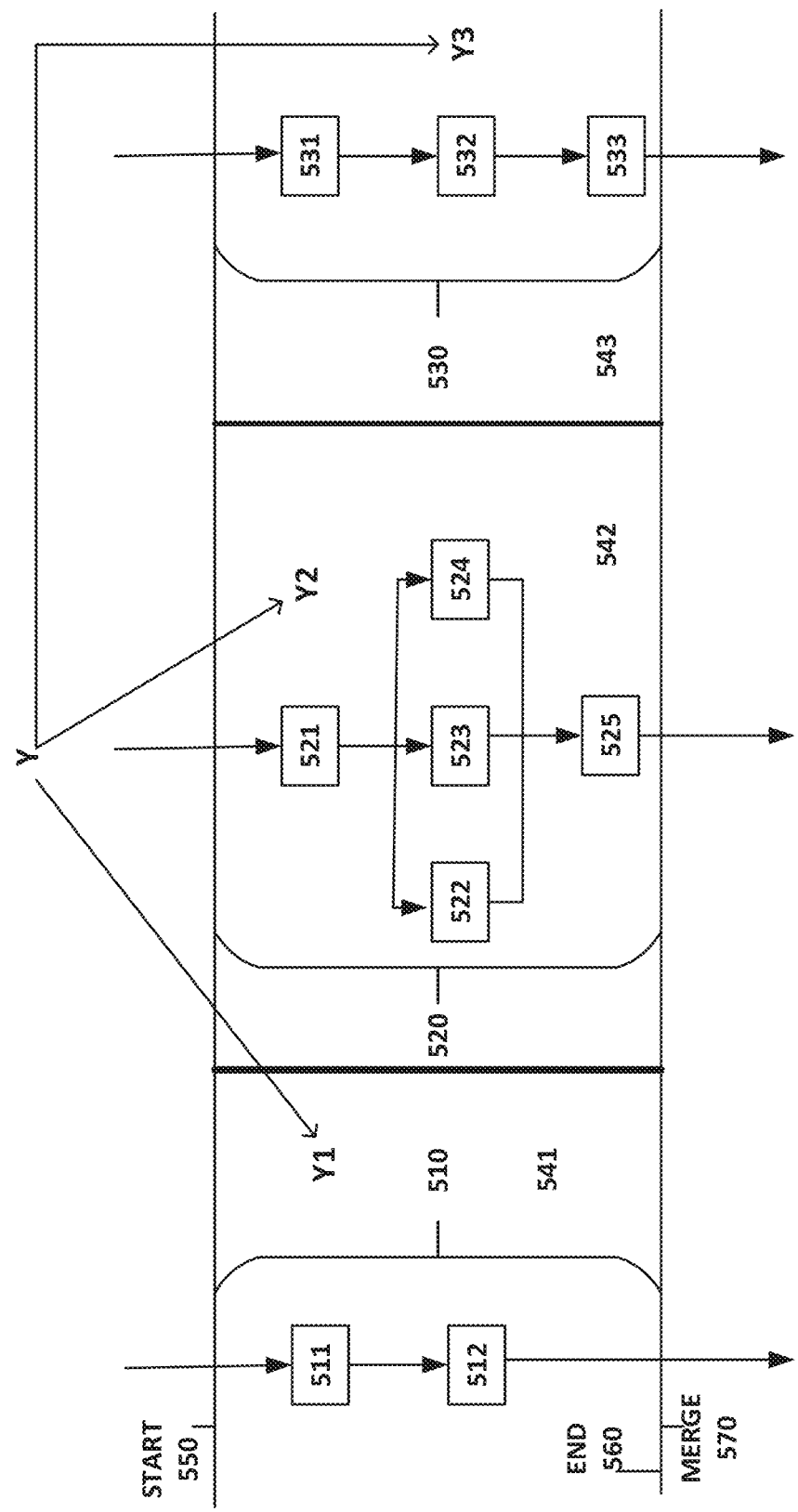

STATE MANAGEMENT PERSISTENCE

CROSS REFERENCES TO RELATED APPLICATIONS

This application claims the benefit of U.S. Provisional Patent Application Ser. No. 62/564,945, entitled STATE MANAGEMENT PERSISTENCE, filed on Sep. 28, 2017 and U.S. Provisional Patent Application. Ser. No. 62/629,523, entitled STATE MANAGEMENT PERSISTENCE, filed on Feb. 12, 2018 and U.S. Provisional Patent Application Ser. No. 62/564,946, entitled ROUTER CONFIGURATION, filed on Sep. 28, 2017 and U.S. Provisional Patent Application Ser. No. 62/629,526, entitled ROUTER CONFIGURATION, filed on Feb. 12, 2018, which are hereby incorporated by reference as if set forth in full in this application for all purposes.

BACKGROUND

A process is a portion of code that is executed to perform a function. In parallel processing systems, multiple processes can be executing simultaneously. Two or more of those processes can update state that they share (also referred to as "shared state"). If two or more processes update shared state at the same time or nearly the same time, potential conflicts can occur. For example, if two processes share a variable Y and the first process updated the variable Y to the value of 4 and the second process updated the variable Y to 5, the first process' update would be wiped out.

Conventionally, the problem of multiple parallel processes simultaneously updating shared state was either not handled at all or sophisticated programming mechanisms, such as locks, mutexes, or critical sections, were used. For example, conventionally, a sophisticated programming mechanism could prevent the respective instructions of the first and second process from being executed simultaneously. Thus, the execution of the first and second process would be mutually exclusive. However, writing code that uses such sophisticated programming mechanisms requires the developer to have sophisticated programming skills.

SUMMARY

A hierarchy of containers is received at a user interface of a design time tool. The hierarchy of containers includes a container nested inside of one or more other containers. Each of the containers includes a different part of a web client application. The design time tool associates state with each of the containers in the hierarchy of containers. Lifecycles for each of the containers are received at the user interface. The design time tool creates computer executable instructions in the web client application that enable state for each of the containers to be created and destroyed according to the hierarchy based on the respective lifecycles of each of the containers. The design time tool provides each of the containers access to its own state and state of containers that include it based on respective lifecycle events associated with each of the containers.

An embodiment provides a non-transitory processor-readable storage device including instructions for a method of receiving, at a user interface of a design time tool, a hierarchy of containers with a container nested inside of one or more other containers, wherein each of the containers includes a different part of a web client application; associating, performed at the design time tool, state with each of the containers in the hierarchy of containers; receiving, at the user interface of the design time tool, lifecycles for each of the containers; creating, performed by the design time tool, computer executable instructions for the web client application that enable state for each of the containers to be created and destroyed according to the hierarchy based on the respective lifecycles of each of the containers; and providing, performed at the design time tool, each of the containers access to its own state and state of containers that include it based on respective lifecycle events associated with each of the containers.

A further understanding of the nature and the advantages of particular embodiments disclosed herein may be realized by reference of the remaining portions of the specification and the attached drawings.

BRIEF DESCRIPTION OF THE DRAWINGS

FIG. 1 depicts URLs, according to various embodiments.

FIG. 5A depicts action chains executing in parallel, according to one embodiment.

DETAILED DESCRIPTION OF EMBODIMENTS

Figure 2:
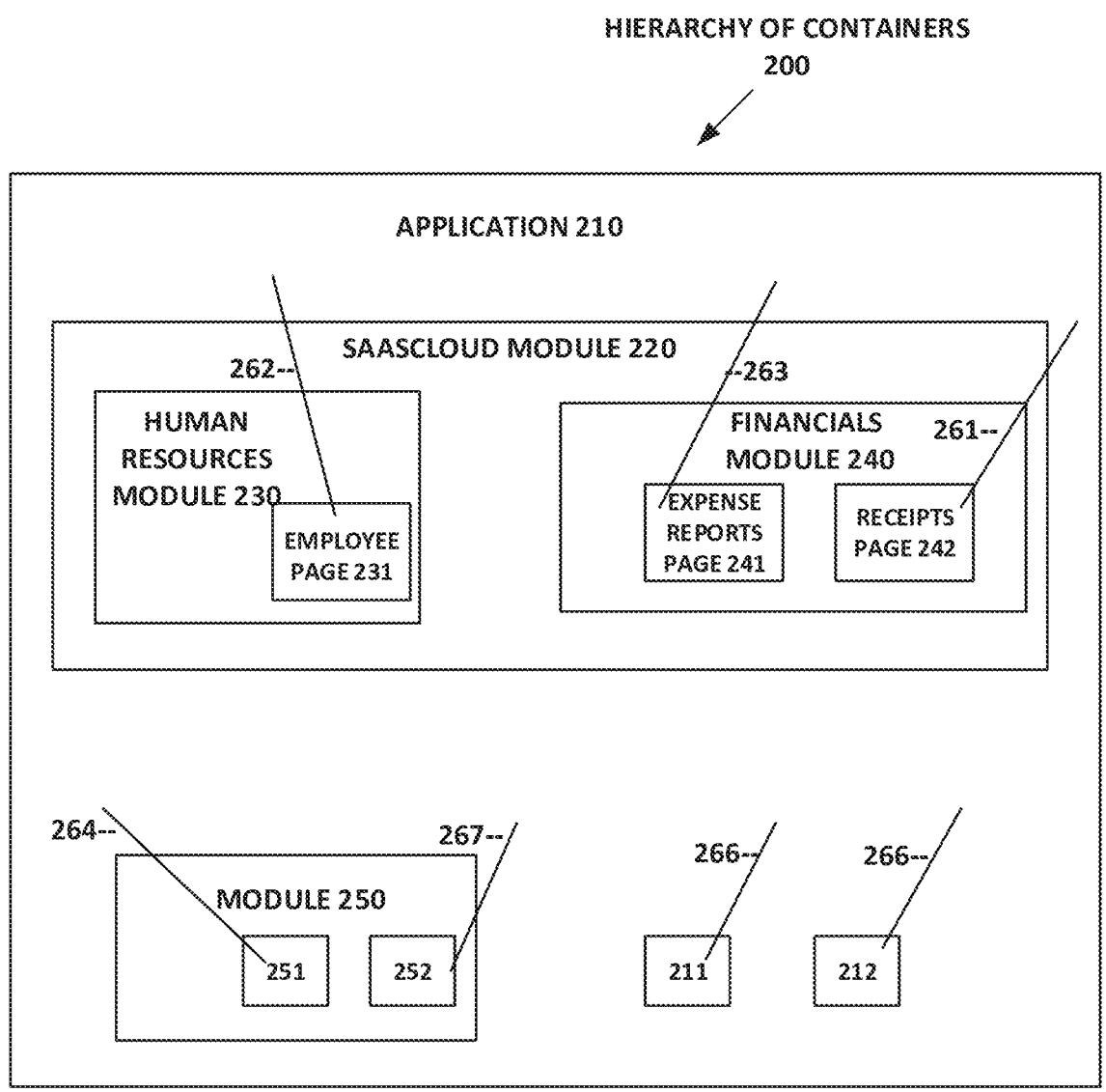
FIG. 2 depicts a block diagram of a hierarchy of containers, according to an embodiment.

The problem pertains to when one computer executable instruction is changing a state, such as a variable, while another computer executable instruction is reading that state. Conventionally, this problem was either not handled at all or sophisticated programming mechanisms, such as locks, mutexes, or critical sections, were used. Writing code that uses such sophisticated programming mechanisms requires the developer to be sophisticated. Various embodiments of state management persistence address these issues without using sophisticated programming mechanisms in a manner that enables an unsophisticated developer to create the code.

Various embodiments provide automatic handling of when a piece of application state is created, restored, and torn down. This persistence lifecycle can be used to mimic browser behaviors, such as session persistence, history state, etc.

Various embodiments provide at least two aspects of state management: containership and lifetime.

Containership (also referred to as "scopes") influences when a piece of state is active. For example, a page scope state is contained within a page. It is only available when a page is viewed and is no longer accessible when the user navigates away from that page, according to one embodiment.

Persistence refers to how long the system keeps that state around. Using a web example, a piece of state can be kept around for the entire web session (it's there until a user closes their browser tab), across web sessions (it's there even if the user closes their browser tab and comes back), or even used to mimic browser history (it's there if the user hits the back button, but not if the user navigates to a piece of user interface directly).

State can be managed by the combination of containership and persistence. For example, when a user interacts with a UI causing a page to be displayed, all state contained by that page is initialized and made available. Depending on its persistence settings, when it is initialized, it can be defaulted to a value that was saved away.

Further, conventionally, uniform resource locators (URLs) were only used for specifying a path for displaying a page. Therefore, the web application, the modules, the page, and the URL or the resources that are in the browser are independent of any other page regardless of where those two pages are in the structure of the application. Various embodiments provide for managing the state of an application, modules and pages based on the parts of URLS (also referred to herein as "router configuration").

Various embodiments provide a highly modular way of configuring an application where each sub path of a URL represents a module containing it's own startup/tear down lifecycle.

Containership (also referred to herein as "scopes") influences when a piece of state is active. For example, a page scope state is contained within a page. It is only available when a page is viewed and is no longer accessible when the user navigates away from that page.

A container in an exemplary system can be a page (a single piece of UI the user is viewing at a time), a flow (collection of pages), an application (a collection of flows), etc. Each container, as described herein, has its own collection of state that is independently managed.

Given the following exemplary URL, for the sake of illustration:

mycompany.com/sales/accounts/contact the URL can be decompose into its parts—mycompany, sales, accounts, and contact. The mycompany.com can represent the whole application. The sales and accounts parts can represent separate but nested flows. Finally, contact is the page to load into a web browser.

Given this URL, the state for the application can be created, then the sales flow, then the accounts flow, and then the contacts page.

In an example, assume that the user then navigates to the following URL:

mycompany.com/sales/opportunity/detail

In this case, the user is in the same application, mycompany.com, and sales flow. The accounts flow and the contacts page are exited. Therefore, according to one embodiment, the system will destroy the state of the accounts flow and contacts page leaving the application and sales flow state intact, then initialize state for the opportunity flow and detail page.

FIG. 1 depicts URLs, according to various embodiments.

Each of the URLs 110, 120, 130 include parts 101-103, 122, 123, 133 separated by back slashes. The first backlash 100 in each of the URLs represents an application. The last part 103, 123, 133 of the URLs 110, 120, 130 represent web pages in that application. The parts 101, 120, 122 between the first backslash 100 of the respective URLs 110, 120, 130 represent modules.

Each of the applications, modules, and pages are in their own containers, according to one embodiment. The parts of a URL are used to determine how to navigate the applications, modules, and pages and is used as a part of determining when to create and to destroy state, such as variables, for the respective containers.

Entering the URLs 110, 120, 130 into a browser causes the browser to display the respective pages. For example, entering URL 110 causes an expense reports page to be displayed; entering URL 120 causes an employee page to be displayed and so on.

FIG. 2 depicts a block diagram of a hierarchy of containers, according to an embodiment.

The application container 210 includes the SaaSCloud module container 220, module 250 and pages 211, 212. The SaaSCloud module container 220 includes the human resource module container 230 and the financial module container 240. The human resource module container includes the employee page container 231. The financial module container 240 includes the expense report page container 241 and the receipts page container 242. The module container 250 includes the page containers 251 and 252.

The containers are organized in a hierarchy of containers 200. Containers associated with the hierarchy 200 can be nested. There is a path of hierarchy (also referred to as "hierarchy path") for each of the containers that is defined by the containers that contain it and the order in which they are contained. For example, the receipts page container 242's path of hierarchy 261 is defined by the receipts page container 242 that is inside of the financial module container 240 which is inside of the SaaSCloud module container 220 which is inside of the application container 210. FIG. 2 depicts other hierarchy paths 262-267 along various nested containers. According to one embodiment, each of the containers can have an associated hierarchy path.

Figure 3:
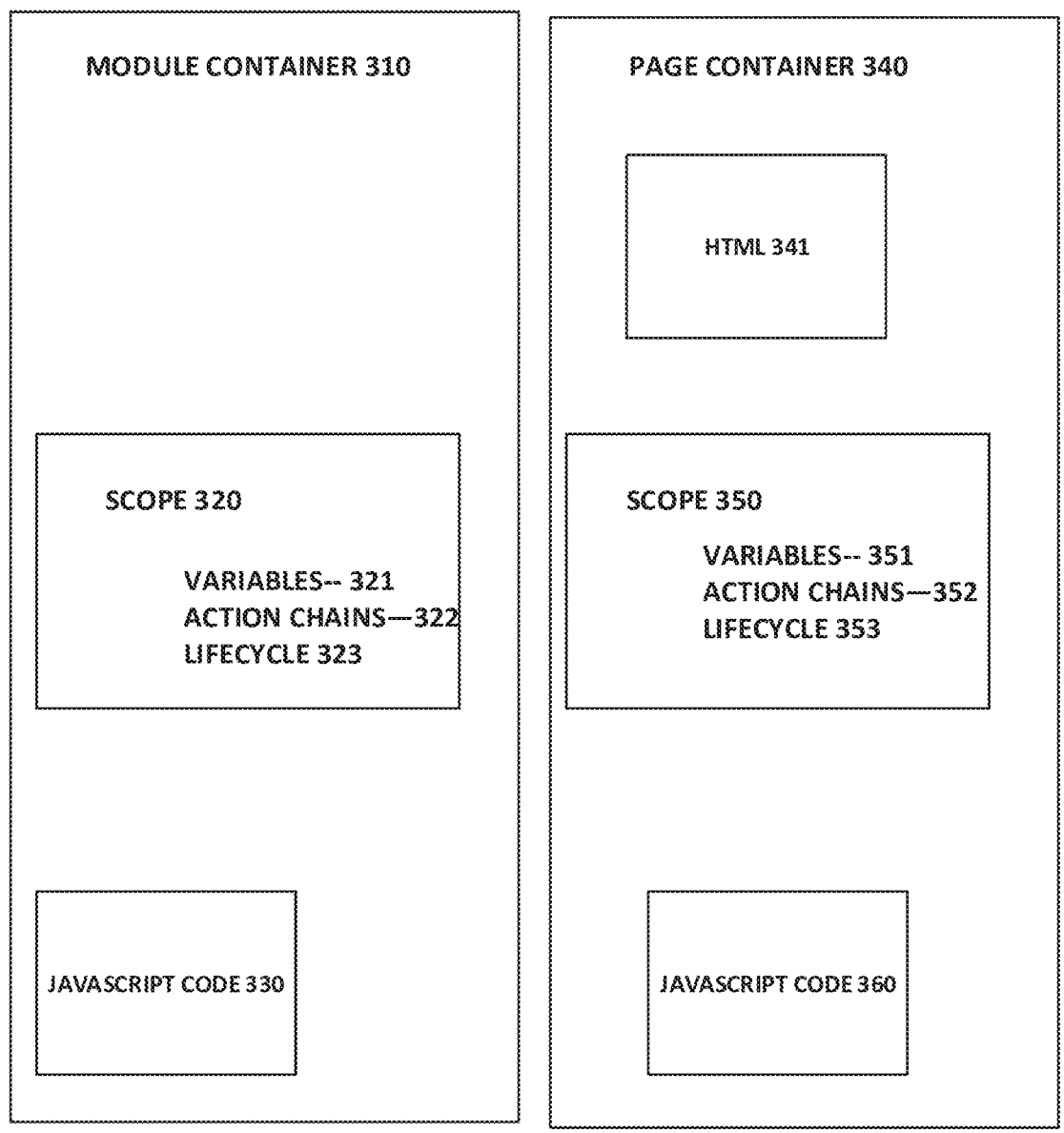
FIG. 3 depicts formats of containers, according to various embodiments.

FIG. 3 depicts formats of containers, according to various embodiments.

A module container 310 includes scope 320 and JAVASCRIPT™ code 330. The scope 320 includes variables 321 that are used by the module container 310, action chains 322 that execute as part of the module for the container 310, and a lifecycle 323 for the module container 310.

A page container 340 includes HyperText Markup Language (HTML) 341, scope 350, and JAVASCRIPT™ 360. The scope 350 also includes variables 351 used by the page container 340, action chains 352 that execute as part of the page for the container 340, and a lifecycle 353 for the page container 340.

An application container can include one or more module containers and/or one or more page containers. As depicted in FIG. 2, containers can be nested any number of depths within other containers forming a hierarchy of containers with various hierarchy paths.

Each container 310, 340 has an associated lifecycle 323, 353. A lifecycle includes phases. Examples of the phases include "beforeEnter" a page, "enter" a page, a page is "interactable", "canExit", which means a page can be exited, and "beforeExit" phase that occurs before exiting a page. The phases are mutually exclusive. In other words, only one phase for a container's lifecycle can be operating at a time. Further, the phases operate in sequence. More specifically, "beforeEnter" is followed by "Enter," which is followed by "interactable," and so on until "beforeExit."

The lifecycle phases are events that can be used for starting action chains.

Figure 4:
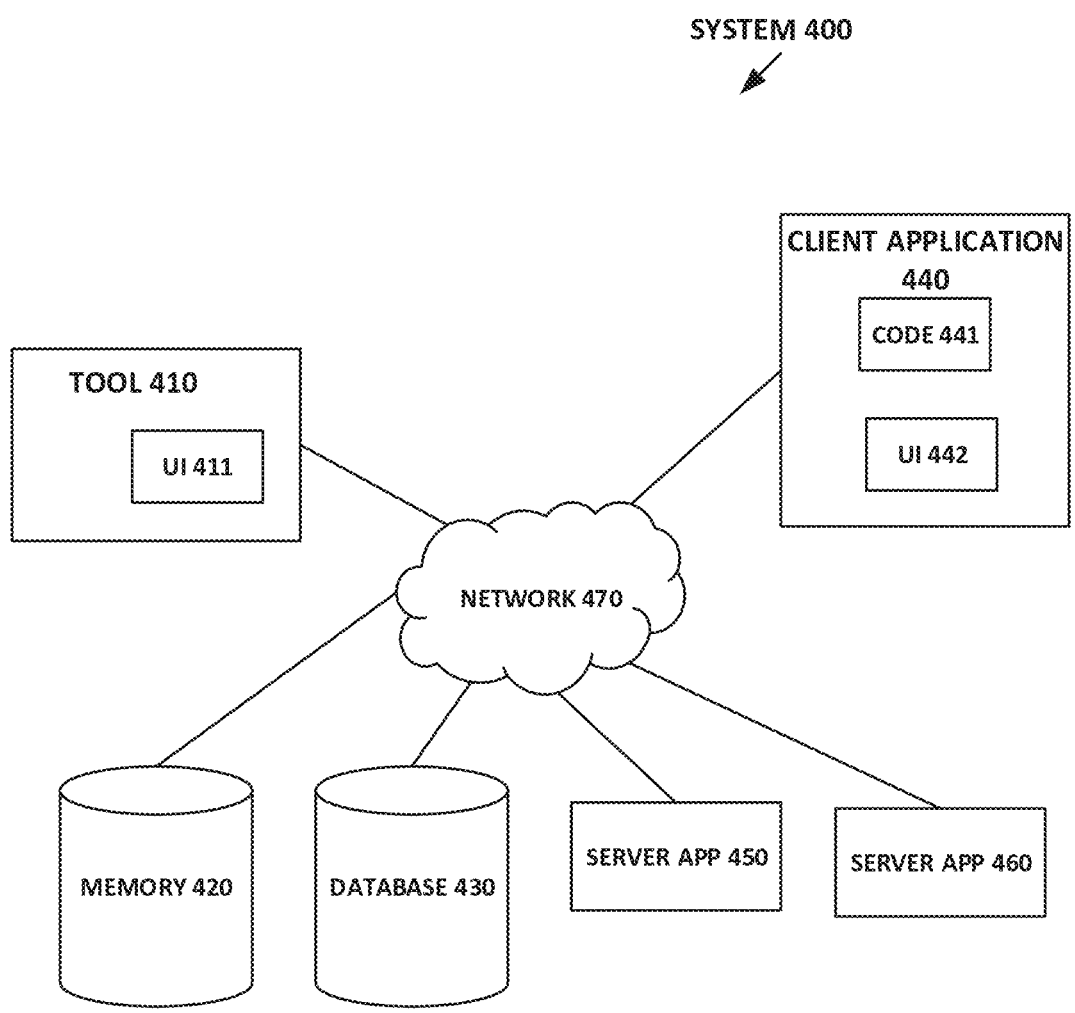
FIG. 4 depicts a system, according to various embodiments.

FIG. 4 depicts a system 400, according to various embodiments.

The system 400 includes a tool 410, hardware memory 420, a database 430, server applications 450, 460, a client application 440, and a network 470 for communicating between them 410, 420, 430, 450, 460, and 440. The design time tool 410 provides a user interface 411. The client application 440 includes code 441 and a user interface 442.

According to one embodiment, the client application 440 is executed in or by the tool 410. The tool 410 and the client application 440 can execute on the same or on separate computers that communicate with each other.

The design time tool 410 includes a user interface 411, for example of web pages, for creating the client application 440. The tool 440 can provide visual application building capabilities that the developer or team use via the cloud to create the client application 440. Visual Builder Cloud Service (VBCS) is modified to provide various visual application building capability embodiments discussed herein. The code 441 includes computer executable instructions that are created by the tool 440 based on the developer's or team's input to the user interface 411.

A user, during the design time of the client application 440, can specify how the computer executable instructions of the code 441 are created via the user interface 411. More specifically, the user interface 411 can be used to create code 441 that defines and implements a hierarchy of containers 200, container information depicted in FIG. 3, and various embodiments discussed herein. Information defining the hierarchy of containers 200, container information depicted in FIG. 3, and various embodiments may be stored in hardware memory 420, database 430, in a computer executing the client application 440, and/or in a computer executing tool 410, as a part of designing the client application and its associated code. The created code 441 during runtime execution may access that information to provide various embodiments. Further, the client application 440 and the associated code 441 executes and communicates with one or more server applications during "runtime." Pages for containers 231, 241, 242 are displayed in the user interface 442 as the result of the execution of the code 441. The pages for containers 231, 241, 242 are displayed in a browser, for example, in response to a user entering URLs, as discussed herein, into the browser executing on a computer that communicates with the client application 440.

The tool 410 provides a "declarative system" that hides many of the complexities of creating the computer instructions of the code 441, for example, by providing, among other things, boxes, arrows, that can be dragged and dropped and data entry fields. The declarative capabilities enable the unsophisticated programmer to create containers, hierarchy of containers, action chains, events, specify that an action chain will be trigger by a specified event and so on using visual representations, such as boxes, arrows, and so on. More specifically, a box and a name entered into a data entry field can be used to represent a container. Boxes nested within boxes can be used to represent containers within containers as depicted in FIG. 2. Lines or arrows can be used to specify that a lifecycle phase for a particular container triggers an action chain. This can be done during design time. Then the underlying computer executable code 441 can be executed during runtime of the client application. The developers are known as "declarative developers" or "declarative programmers." Such declarative developers do not understand how to use sophisticated programming techniques.

State is managed by the combination of containership and persistence. Container formats are depicted in FIG. 3. The containers influence when a variable (also known as "state") is active. Persistence refers to how long variables are kept around. Various types of scope determine the level or type of persistence. Examples of scope include session scope, device scope, and history scope, among others, as discussed herein.

Session scope: the page's variables are destroyed if the page is exited while in the same browser tab; however, those same variables are restored when execution returns into that page as long as in the same browser tab. The variable can be stored in the browser session storage. Therefore, the variable will persist as long as the browser is open.

Device scope: if a browser tab is exited, then the page's variables are destroyed. Those variables are restored even if execution returns several days later to the same page. The variable can be stored in the browser local storage. Therefore, the variable will persist on the device where the application is running even if the browser is closed. Device scope may also be referred to as "local scope."

History scope: the user can see the values of variables even while navigating around from page to page of a client application. For example, the variable value can be stored on the browser history. When navigating back to a page in the browser history using the browser back button or when refreshing the page, the value of the variable is restored to its value at the time the application navigated away from the page.

The scopes can be used to mimic browser behaviors such as session persistence, history state, among others, according to various embodiments. For example, the session scope can be used to provide session persistence and the history scope can be used to provide history state.

Referring to FIG. 2, if the receipts page modifies variables for containers that are shared between the receipts page container 242 and other containers, then the other containers will have access to those modifications. For example, if the receipts page container 242 modifies a variable X in the SaaSCloud module container 220 and a variable Y in the application container 210, then the employee page container 231 can also access those modifications of variables X and Y. In this illustration, this is because both the receipts page container 242 and the employee page container 231 are in the containers 220 and 210. The containers 220 and 210 are associated with the hierarchy paths 261 and 262 of both the receipts page container 242 and the employee page container 231.

According to an embodiment, only one page per client application is displayed at a time. Therefore, the modification of values of variables associated with one hierarchy path will not conflict with the modification of variables associated with another hierarchy path. More specifically, referring to FIG. 2 and continuing the example, although pages 242 and 231 can both access variables X and Y that belong respectively to containers 220 and 210, there will be no conflict because only one of the pages 242, 231 is displayed at a time. Therefore, the pages 242, 231 are prevented from modifying the values of variables X and Y at the same time.

Two different copies of a client application can each display a different page. For example, referring to FIG. 4, assume that there are two copies of the client application 440 and each of those two copies display respective pages. If those two pages both modify the value of a variable X in SaaSCloud module container, then the database 430 can resolve conflicts as part of committing the modifications to the database 430.

Each of the containers can start one or more action chains. Further one or more action chains can be started and executed in parallel per lifecycle phase. For example, referring to FIG. 2, action chains for the SaaSCloud module container 220 and the financials module container 240 can be executed simultaneously.

Since each life cycle phase for a particular container execute mutually exclusively, action chains for different lifecycle phases for that particular container will not execute in parallel. More specifically, referring to FIG. 2, if the receipt page container 242 starts 20 action chains during its "beforeEnter" lifecycle phase, those 20 action chains will complete before the "enter" lifecycle phase for that receipt page container 242.

An action chain for a container can start and cause execution of another action chain for the same container. Further, an action chain in one container can start and cause execution of action chains in the containers along its hierarchy path. For example, referring to FIG. 2, an action chain for the receipt page container 242 can start and cause execution of action chains associated with containers 242, 240, 220, and 210 along its hierarchy path 261.

Since lifecycle phases are events, the lifecycle phases can trigger action chains. For example, the lifecycle phase "enter" for a particular container could trigger one or more action chains.

An action chain can start multiple children action chains that execute in parallel. The multiple children action chains can then join back together.

According to one embodiment, the hierarchy paths correspond with URLs that a user can enter into a browser to display pages for a user interface of the client application 440. For example, referring to FIG. 2 and FIG. 4, the hierarchy path 261 corresponds with URL that specifies "/SaaSCloud/Financials/receipts." More specifically, when a user enters the URL into a browser, the first backslash would cause computer executable instructions in code 441 to start the application container 210. The SaaSCloud part of the URL would cause the computer executable instructions in code 441 start the SaaSCloud Module container 220; the financials part of the URL would cause the computer executable instructions in code 441 to start the financials module container 240; and the receipts part of the URL would cause computer executable instructions in code 441 to start the receipts page container 242 and load the corresponding receipts page. Similarly, the hierarchy path 262 corresponds to a URL that specifies "/SaaSCloud/HumanResources/Employee," and hierarchy path 263 corresponds to a URL that specifies "/SaaSCloud/Financials/ExpenseReport."

State for respective containers are created and destroyed based on the lifecycles associated with each of the containers. A developer can use the tool 410's design time user interface 411 to specify lifecycle events that trigger creation and destruction of state for the respective containers. For example, the "beforeEnter" lifecycle event may trigger creation of the expense report page container 141's state and the "beforeExit" lifecycle event may trigger destruction of the expense report page container 241's state. The lifecycle events that trigger creation of state may be different for containers. For example, creation of state for one container may be triggered by "beforeEnter" while creation of state for another container may be triggered by "Enter." Further, the lifecycle events that trigger destruction of state may be different for containers.

Further, the creation and destruction of the respective container states are performed in accordance with the hierarchy paths. For example, referring to FIGS. 2 and 4, assume that a user enters the URL "/SaaSCloud/Financials/ExpenseReport" into a browser of a computer executing the client application 440. The backslash would start the application container 210. Creation of the application container 210's state is triggered in response to the lifecycle event that a developer specified using the design time user interface 411. The "SaaSCloud" part of the URL would start the SaaSCloud module container 220. Creation of the SaaSCloud module container 220's state is triggered in response to the lifecycle event that the developer specified for container 220 using the design time user interface 411. Similarly, creation of the respective states for the financials module container 240 and the expense report page container 241 are triggered in response to the lifecycle events that the developer specified for those respective containers 240, 241. Now assume that the user enters the URL "/SaaSCloud/HumanResources/Employee" into the browser. The destruction of state of the expense report page container 241 and the state of the financials container 240 will be triggered in response to the lifecycle events that the developer specified for those respective containers 241, 240 using the design time user interface 331. Then creation of the states of the human resource module container 230 and the employee page container 231 will be triggered in response to the lifecycle events that the developer specified for those respective containers 230, 231. Since the hierarchy paths 262, 263 for these respective URLs both share the application container 210 and the SaaSCloud container 220, the states for the containers 210 and 220 will be preserved. Containers can access the state of the containers that include them. For example, container 220 can access the state of container 210. Container 240 can access the state of containers 220 and 210. Container 241 can access the state of containers 240, 220, and 210. However, containers cannot access the state of containers that do not include them. For example, 240 and 241 cannot access the state of containers 230 and 231 and vice versa.

Snapshots of global variables used by an action chain are taken at the beginning of each action chain. For example, if a parent action chain starts two children action chains, three snapshots will be taken.

A snapshot of global variables used by an action chain is taken when the action chain starts execution. For example, assume that there are three snapshots for the respective action chains depicted in FIG. 5A.

FIG. 5A depicts action chains 510, 520, 530 executing in parallel, according to one embodiment. Note that although functions or action chains may be described as executing in "parallel" it is well-known that the idea of parallel execution is commonly used to describe time-sliced processing using a single processor where at a micro-execution level only one action chain at a time is being executed. However, at a higher macro-execution level such as the application instruction level it appears that action chains are acting concurrently or in parallel. In general, embodiments described herein may be adaptable to any execution scheme such as single or multi-processor architectures, multi-threaded, multi-pipelined, time shared processing, distributed or networked (e.g., cloud) processing, etc.

The action chains 510, 520, 30 are chains of actions 511, 512, 521-525, and 531-533. The boxes represent the actions 511, 512, 521-525, and 531-533 and the arrows represent the flow of control from one action to another in the respective action chains. For example, the execution is performed in the direction of the arrow. Actions can be performed serially in an action chain as indicated by a first single box connected with a second single box with an arrow. Actions can also be performed in parallel as indicated by the three boxes 522-524 for the second action chain 520. More specifically, execution from the first action 521 in the second chain 520 can fork into three parallel actions 522-524 and then join again in a lower action 525. Alternatively, one or more actions may be conditionally executed so that not all of the actions in the chain will be performed on each invocation of the action chain. One or more actions can be the children of a previous action. For example, the first action 521 in the second action chain 120 is the parent and the three actions 522-524 that branch from it are the children. In other examples, action 511 is the parent of action 512 and action 531 is the parent of action 533.

Actions can perform various types of processing. For example, one action may read a value from a variable. Another action may write a value to a variable. In another example, there may be a desire to obtain several stock prices that are under a certain threshold and to provide one alert if any of them are under a certain threshold. In this case, an action may fork several other actions where each of those actions request stock prices in parallel. Once the stock prices have been obtained, an action they join into may determine which are below the threshold and provide that information in a single alert. In still another example, a web page may be designed to allow a user to buy several songs by selecting "buy" buttons below each of the songs displayed in a list. Selecting a "buy" button triggers an event that starts an action. Each of the actions can process the buys in parallel.

According to various embodiments, each of the action chains are isolated by partitions 541, 542, 543 (also referred to as "isolations") from each other as represented by the lines separating the action chains. In other words, each action chain has a private view of the state it operates on. For example, Y represents a global state. Examples of state include variables and data streams. Each action chain is provided its own private view of the global state when the action chain begins execution. For example, Y1 is the first action chains private view of Y, Y2 is the second action chains private view of Y, and Y3 is the third action chains private view of Y.

In one embodiment the views Y1, Y2, Y3 can be implemented using variables that are local to each of the three action chain 510, 520, 530 isolations 541, 542, 543. Thus, each local variable Y1, Y2, Y3 can be modified by its respective action chain 510, 520, 530 without modifying global state Y. In effect the global state Y has been snapshotted and is the original state for Y1, Y2, Y3 in case an action chain has a bug and the state of that action chain can be rolled back to the start state for debugging purposes. The views Y1, Y2, Y3 are examples of mutable states because they represent a version of the state Y and can be modified by the respective action chains. The action chains are examples of processes. Note that Y3 is created at a different time than Y1 and Y2. Thus, at action 531 of the third action chain 503, Y may be read only so the value of global variable Y can be used. At action 532, global variable Y is written to and before this happens a local copy Y3 is created and Y3 not Y is written to. Thus, in one embodiment, local variables are created dynamically. In one embodiment, at the end 560 of the action chain a conflict resolution 570 is run to determine from the final values of Y1, Y2, and Y3, what is the new value for global state Y. In one embodiment, the last variable Y1, Y2, or Y3 written to is the new value for global state Y.

Figure 5B:
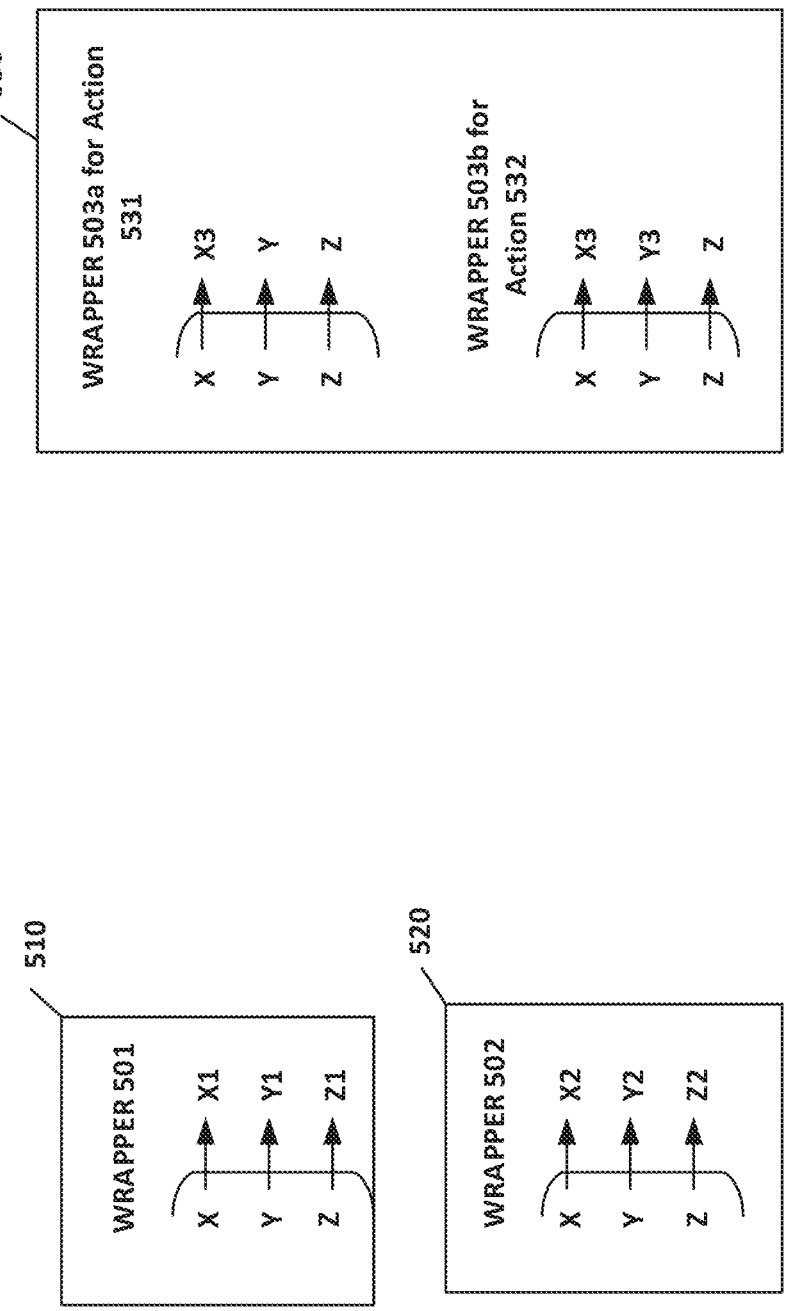
FIG. 5B depicts an implementation of snapshots, according to one embodiment.

FIG. 5B depicts an implementation of snapshots, according to one embodiment. A snapshot of global variables used by an action chain is taken when the action chain starts execution. FIG. 5B depicts an example of three wrappers, i.e., 501, 502, and 503a/503b for the respective action chains 510, 520, 530 depicted in FIG. 5B. Assume that the global variables are X, Y, and Z. In this example, for each action chain, 510, 520, 530, a wrapper or a proxy is used to interface with the global variables X, Y, and Z. That wrapper or proxy is used to isolate, for example, the private views Y1, Y2, Y3 of the respective three action chains from the global state of Y. For action chain 530, the wrapper 503a creates a local copy of global variable X, i.e., local copy X3, but not of global variables Y and Z, because at this point in time, in this example, Y and Z are read only. Thus, the wrapper 503a just passes through the values of Y and Z. At a subsequent time, when Y is written to, wrapper 503b [in this embodiment, wrapper 503a and 503b are the same wrapper code just executed at different points in time] creates a local copy Y3. Action chain 530 uses at this time [action chain 532] its local copy of X, i.e., X3, and Z is just passed through again as it is read only. The wrapper or proxy provides an association between the shared variable Y and the private views Y1, Y2, Y3 that can be used as part of replacing an explicit computer executable instruction to modify Y with respective implicit computer executable instructions to modify Y1, Y2, and Y3 instead during the runtime execution the respective action chains 251 in the client application 250.

Similarly, X1, X2, X3 provide private views for the respective action chains to global variable X; and, Z1, and Z2 provide private views for the respective action chains to global variable Z.

Although for the sake of illustration, FIG. 5B depicts three sets of variables X, Y, and Z for the three respective snapshots, since X, Y, and Z are global variables for the client application, the Xs of each are the same variable, the Ys of each are the same variable, and the Zs of each are the same variable.

Snapshots and the associated wrappers can be nested. For example, if a first action chain starts another action chain, two snapshots will be taken—one snapshot for the parent action chain and a second snapshot for the child action chain. The second snapshot will be nested inside of the first snapshot. In an example, if an action chain starts two other action chains, three snapshots will be taken.

The action chains can read and write to the global variables X, Y, and Z via explicit computer executable instructions specified by a developer of the client application and execution of those explicit computer instructions are replaced with execution of appropriate implicit computer instructions to redirect those operations to the appropriate private views. For example, an explicit computer executable instruction, such as Y=Y+1, can be replaced with in implicit computer instructions to create the wrapper, obtain local storage for a private view Y1, assign Y1 the value of Y, and Y1=Y1+1.

According to one embodiment, snapshots are only taken of variables that will be modified. Snapshots are not taken of read only variables.

According to one embodiment, a private view of a global variable is created just before the global variable is modified.

According to one embodiment, global variables are copied into a wrapper, thus, creating private views. Modifications to the variables are tracked to determine which variable states are changed. Creating private views can be detailed until their respective global variables are to be read, or until another process modifies them.

The pages depicted in FIGS. 6-18 are part of the tool's UI 411. The user interface for the state management persistence is part of the tool's user interface 411. The user interface for router configuration is also part of the tool's user interface 411. The user interface 411 generates computer executable instructions, during design time, that become part of the code 441, which are executed during runtime of the client application.

Figure 6:
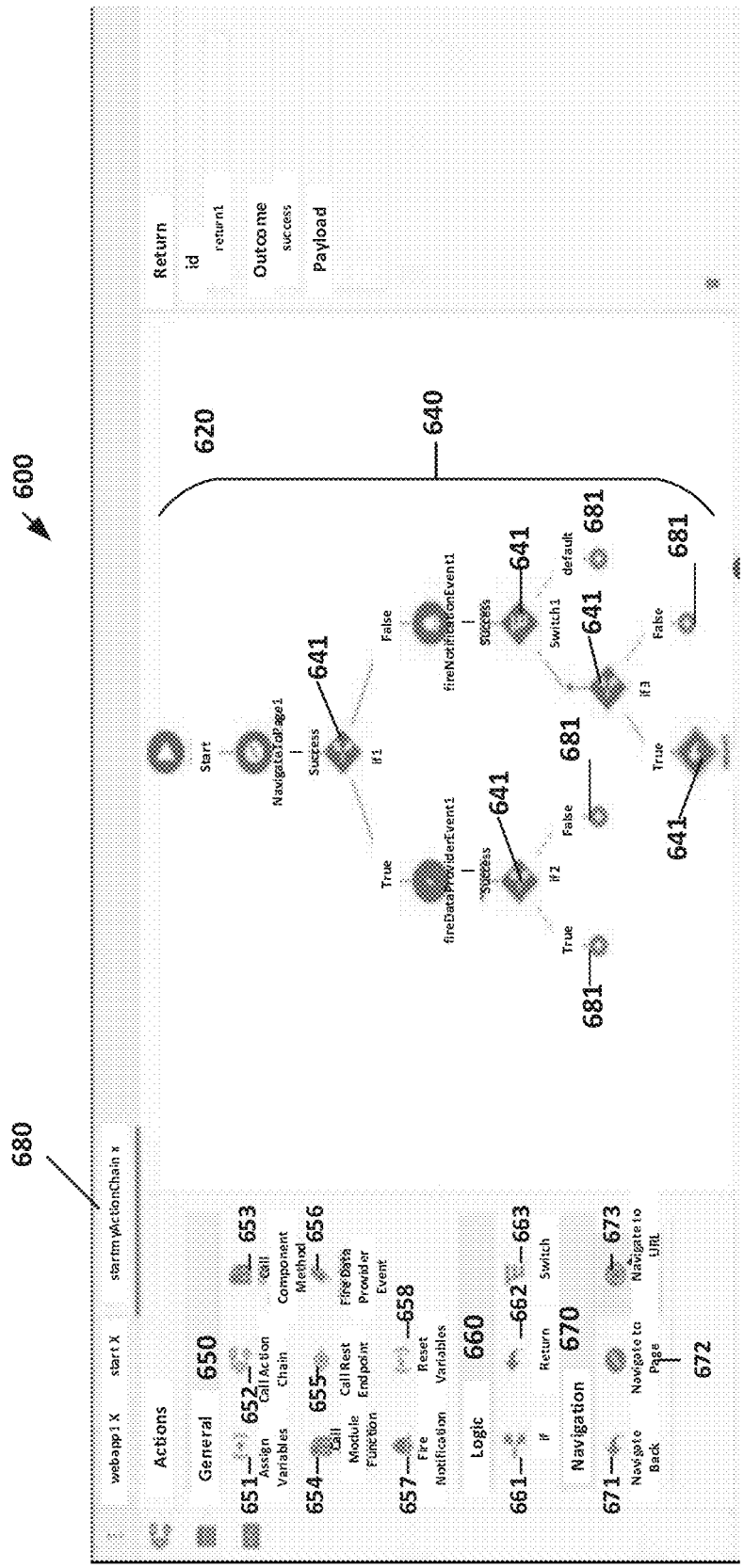
FIG. 6 depicts a page for creating an action chain for a button that will be part of the client application's UI, according to one embodiment.

The design tool 410's UI 411 lets a developer customize a page. FIG. 6 depicts a screen shot of a page 600 for creating an action chain for a button that will be part of the UI 442, according to one embodiment. A description section can be added.

Page 600 can be displayed by selecting the startmyActionChain tab 680. The page 600 of UI 411 includes a palette 610 of actions to the left that can be added to the action chain 640. The middle section 620 of the page 600 depicts a flow diagram that represents one or more sequences of actions in the action chain 640. The diamonds 641 represent "if" statements or branch conditions for determining which of multiple alternate paths the execution of the action chain 640 can take.

The pallet 610 has three sections 650, 660, 670 labeled "general," "logic," and "navigation" as shown in FIG. 6. Each section 650, 660, 670 includes icons that represent actions that can be dragged and dropped into the middle section 620 to create the action chain 640.

The general section 650 has three rows of icons. In the first row of the general section, the first icon 651 represents assign variables. For example, this icon 651 can be used for setting a variable to a different value. The second icon 652 in the first row, represents call action chain. This allows the developer to specify to a call another action chain from this action. The third icon 653 in the first row represents a call component method that lets the developer determine which UI component, like a button, on a page being created for the UI 442 to call.

The second row in the general section also includes three icons. The first icon 654 in the second row is the "call module function" icon. This enables a developer to define their own function in the JAVASCRIPT™ of the page being created for the UI 442. The call module function icon then allows the developer to create code that calls those functions. The second icon 655 in the second row is the "call REST end point" icon. This action allows the developer to create code that calls a REST end point to update data or request data.

The third row in the general section 650 also includes two icons. The first icon 657 in the third row is the "fire notification" icon. It can be used to put a message onto a page that the action chain is being used to implement. The second icon 658 in the third row is the "reset variables" icon. It can be used to reset the value of a state back to its default value.

The logic section 660 includes three icons 661-663. This section enables the creation of logic flow in the action chain. The first icon 661 in the logic section represents an action for an "if" condition. The second icon 662 in the logic section represents a switch. The third icon 663 in the logic section represents a return. The third icon 663 can be used at the end of an action chain to return a specific outcome or value. The third icon 663 is useful when calling an action chain from another action chain.

The navigation section 670 includes three icons 671-673. The first icon 671 in the navigation section enables the developer to create code that navigates to the previous page. The previous page in this case would be the previous page in the client computer 450's browser's history. The second icon 672 in the navigation section enables the developer to create code that navigates to a page in a client application 650 during run time. For example, this icon 672 can be used to create computer executable code that navigates from an expense report page of the client application's UI 442 to an employee page of the client application's UI 442. The third icon 673 in the navigation section enables the developer to create code that navigates to a URL that is not in the currently executing client application 450.

Figure 7:
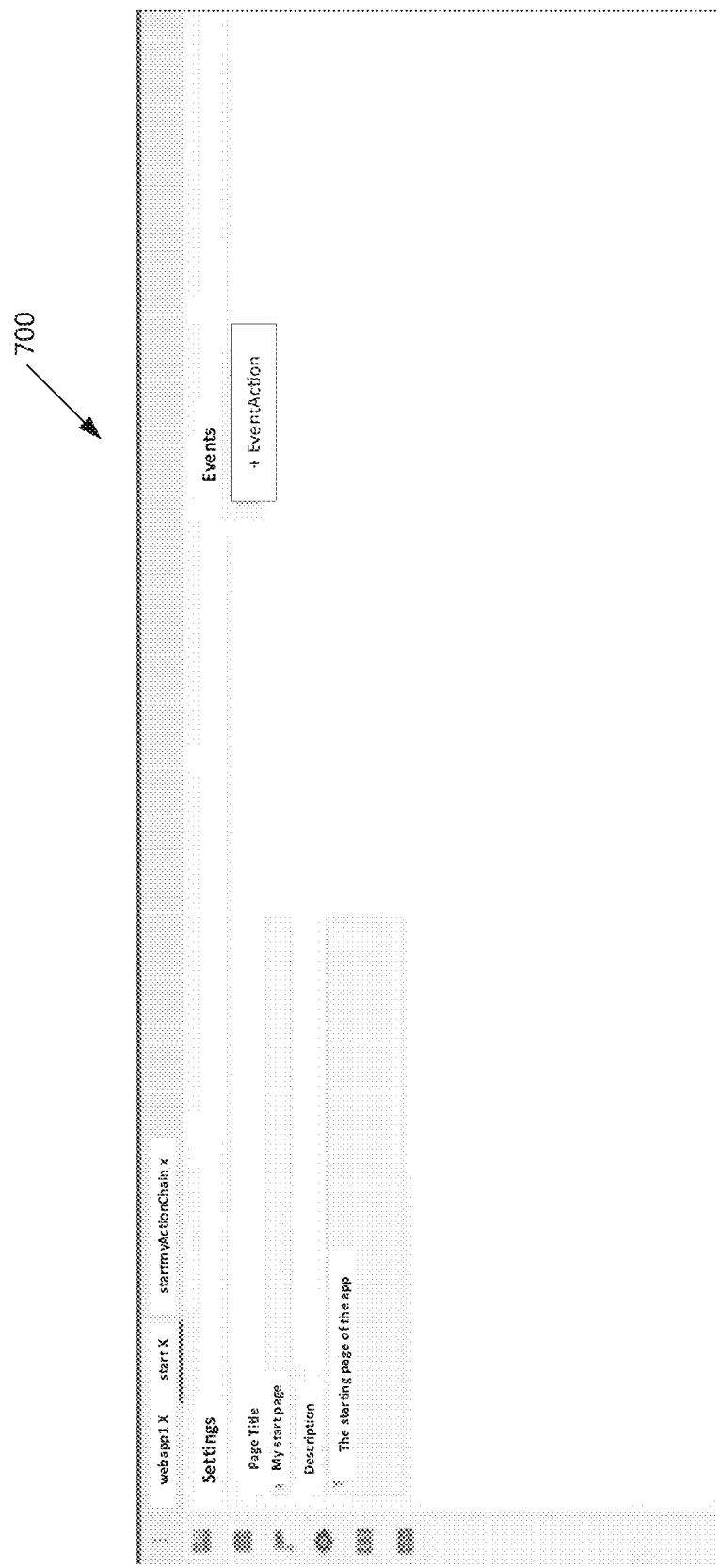
FIG. 7 depicts a screen shot of a settings panel page, according to one embodiment.

An action can be associated with a container phase by selecting the tabs that represent artifacts, such as a web application, page, and action chain; and then within the page a developer can go to the settings panel. FIG. 7 depicts a screen shot of a settings panel page 700, according to one embodiment.

Figure 8:
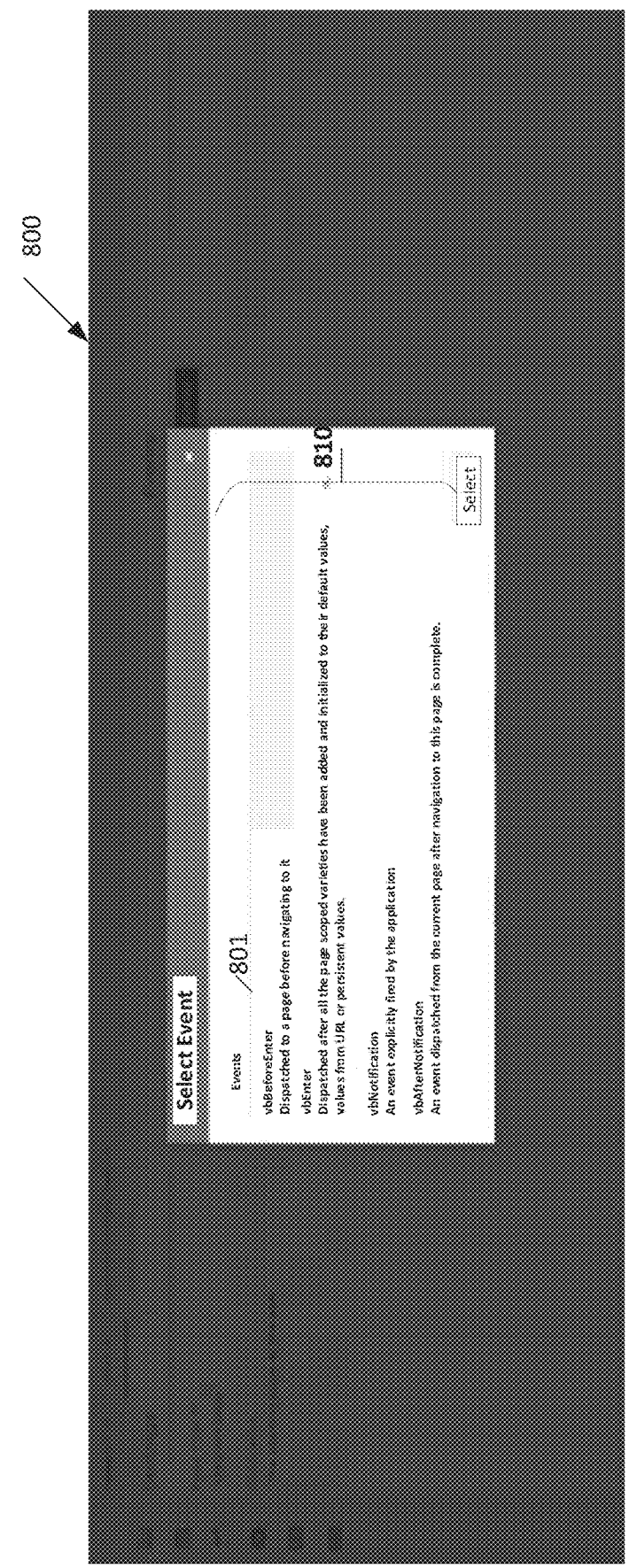
FIG. 8 depicts a web page for binding a lifecycle event to a user interface component, according to one embodiment.

FIG. 8 depicts a web page 800 for binding a lifecycle event to a user interface component, according to one embodiment. The developer can bind to lifecycle events by selecting a lifecycle event, such as "beforeEnter" 801 from the list 810 depicted in the screenshot of the page 800.

Figure 9:
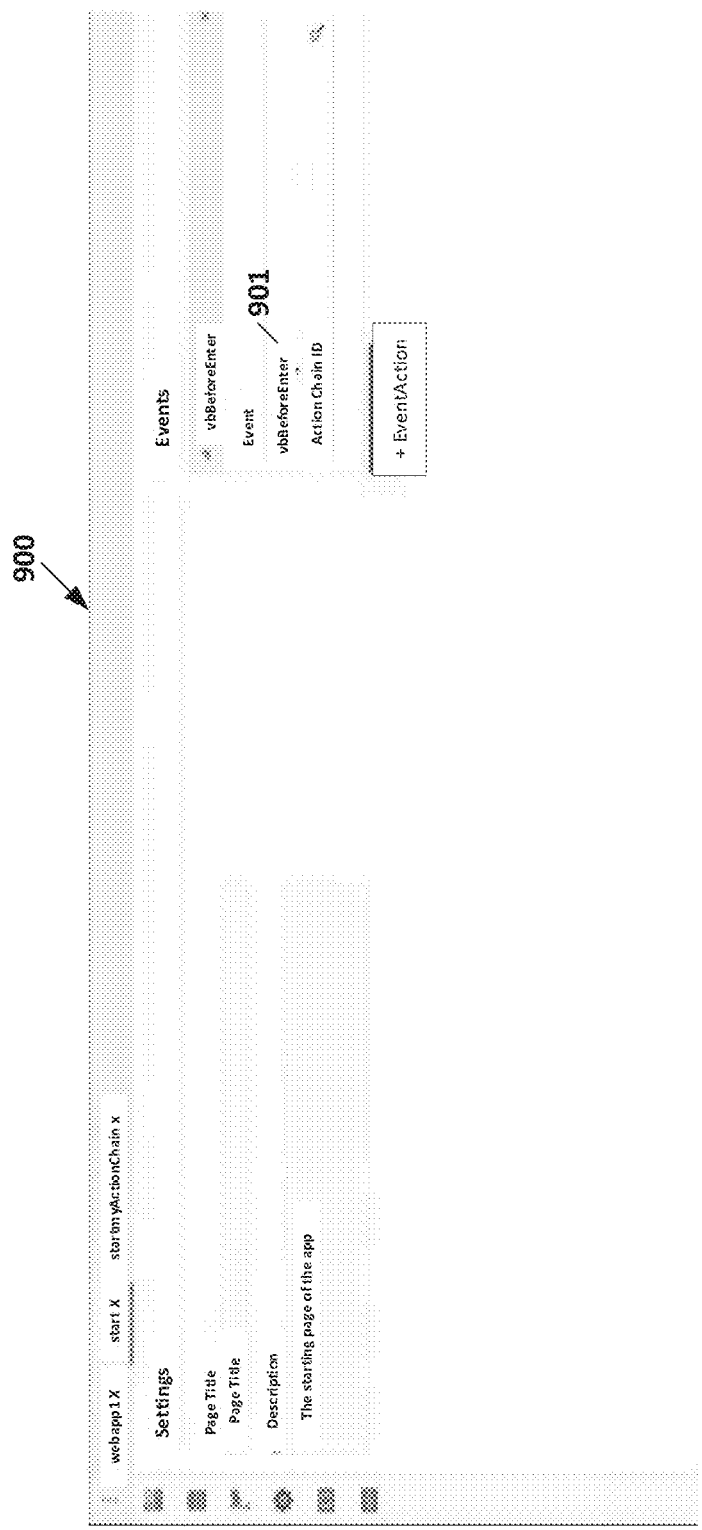
FIG. 9 depicts a web page for generating validation code, according to one embodiment.

FIG. 9 depicts a web page 900 for generating validation code, according to one embodiment. The developer can use the page 900 to generate code that performs validation on what a user is allowed to enter into the page when it is executing in the client application's user interface 442 that is being created. The user can select option 901 to enter validation code.

Figure 10:
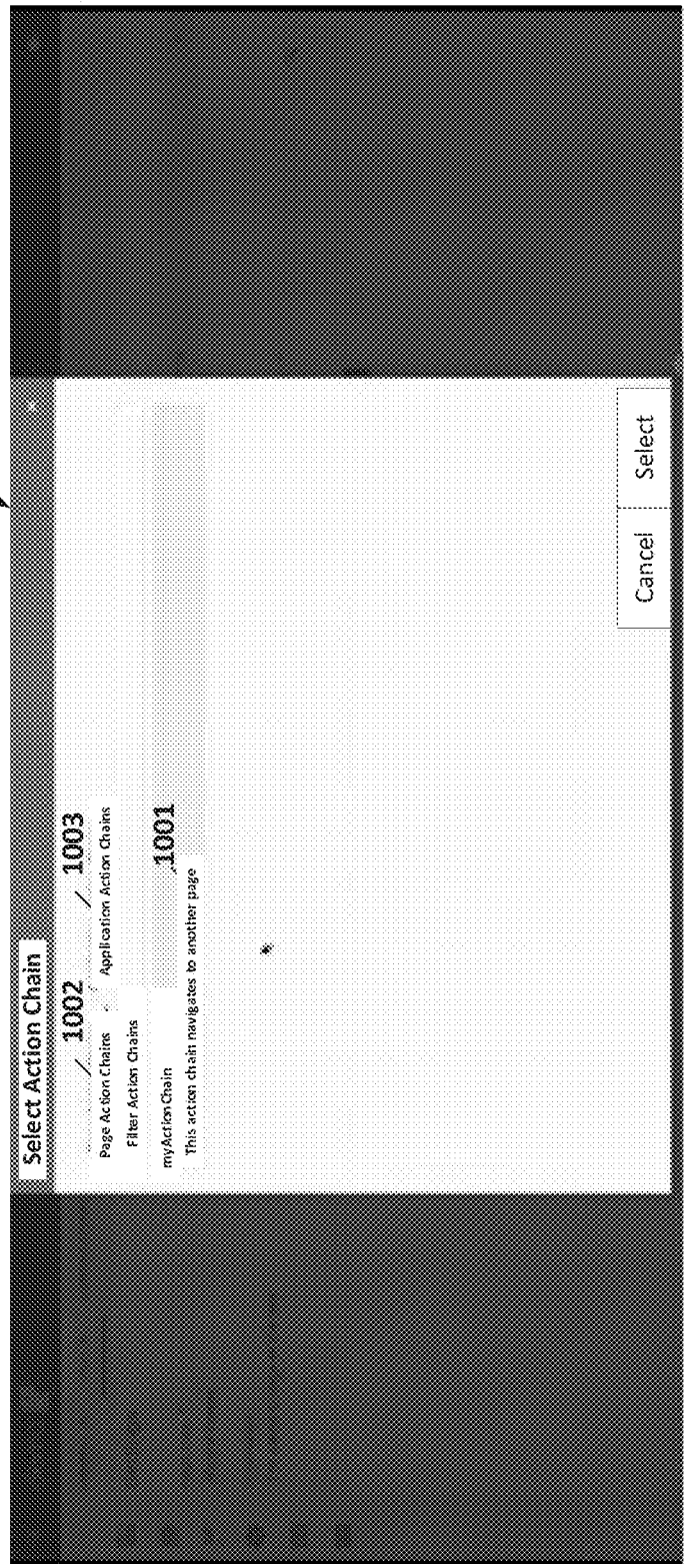
FIG. 10 depicts a web page for selecting an action chain, according to one embodiment.

FIG. 10 depicts a web page 1000 for selecting an action chain, according to one embodiment. The developer can choose the action chain to be called in response to the lifecycle event selected from web page 800 (FIG. 8). For example, the page 1000 depicts a myActionChain 1001 that the developer can select under the page action chains tab 1002. The page 1000 also provides an application action chain tab 1003.

Figure 11:
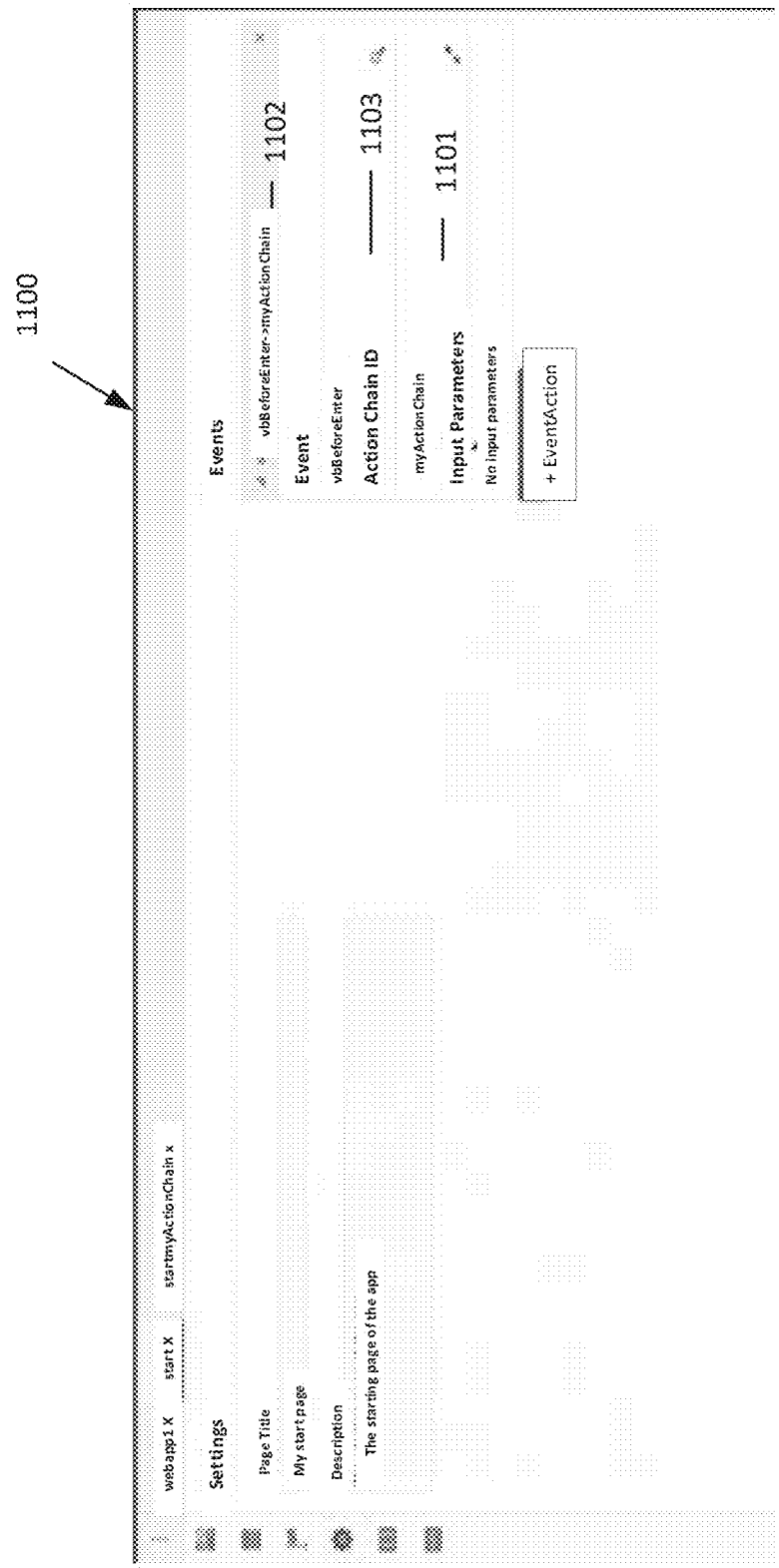
FIG. 11 depicts a web page that the developer can use to map input parameters they want for that action chain using the page, according to one embodiment.

FIG. 11 depicts a web page 1100 that the developer can use to map input parameters they want for that action chain using the page, according to one embodiment. For example, the developer can click on "input Parameters" 1101 that appears below myActionChain 1103 to map input parameters to their selected action chain, which is illustrated as myActionChain above fields 1101 (FIG. 11) and 1001 (FIG. 10).

Referring to the page 1100, an action chain has an identifier (ID) that can be specified in the Action Chain ID field 1102.

Figure 12:
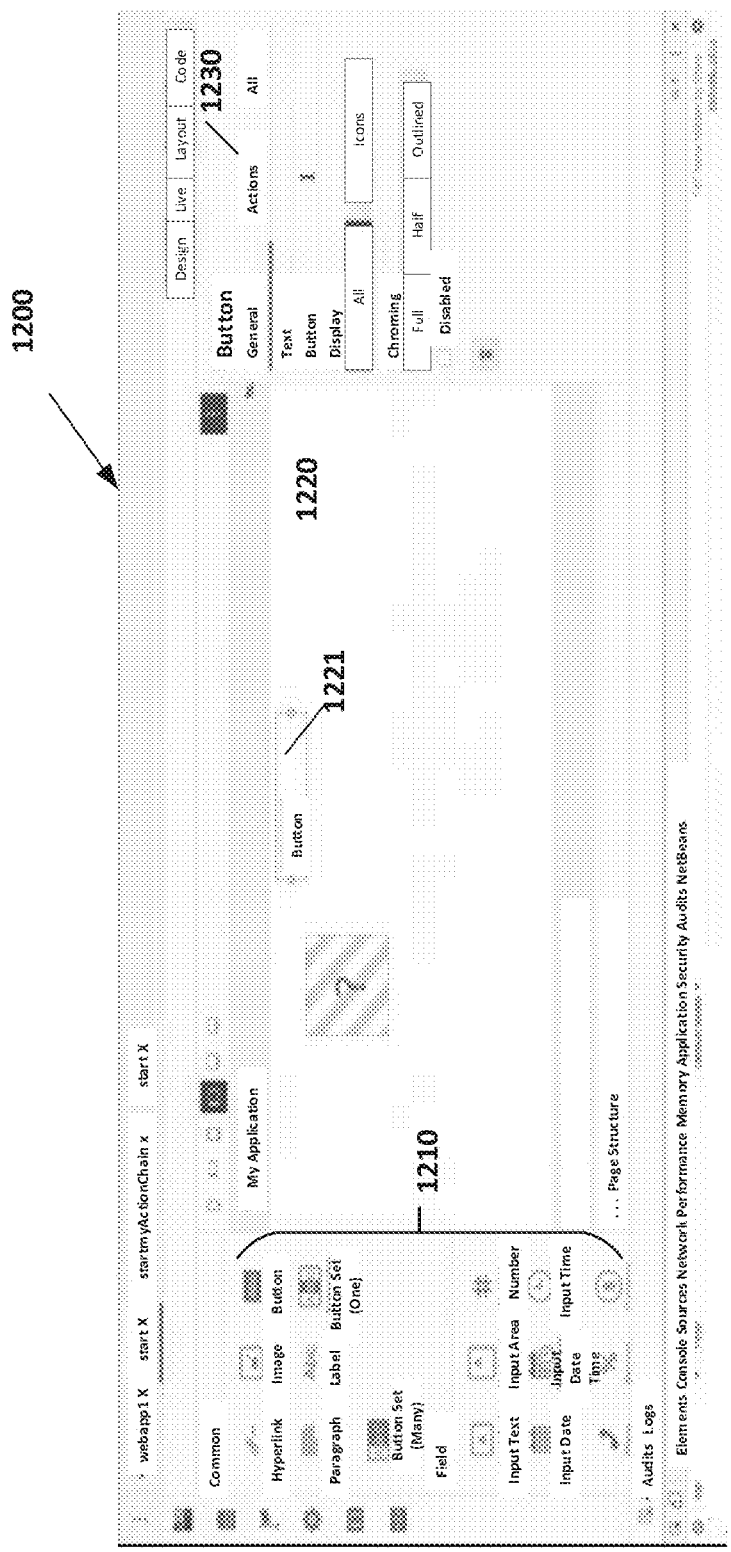
FIG. 12 depicts a web page that the unsophisticated developer can use to bind a User Interface (UI) component to component events, according to one embodiment.

FIG. 12 depicts a web page 1200 that the unsophisticated developer can use to bind a UI component to component events, according to one embodiment. For example, the developer can drag a UI component from the palette 1210 on the left into the pane 1220 in the middle. In this example, the dragged UI component is a button 1221. If the developer selects the action tab 1230 depicted in FIG. 12, a list of events will be displayed in response. The developer can select one of the events to bind to the UI component 1221 displayed in the middle pane 1220.

In addition, the developer can click on a representation 1221 of a UI component, such as the button, to display properties for that UI component.

Figure 13:
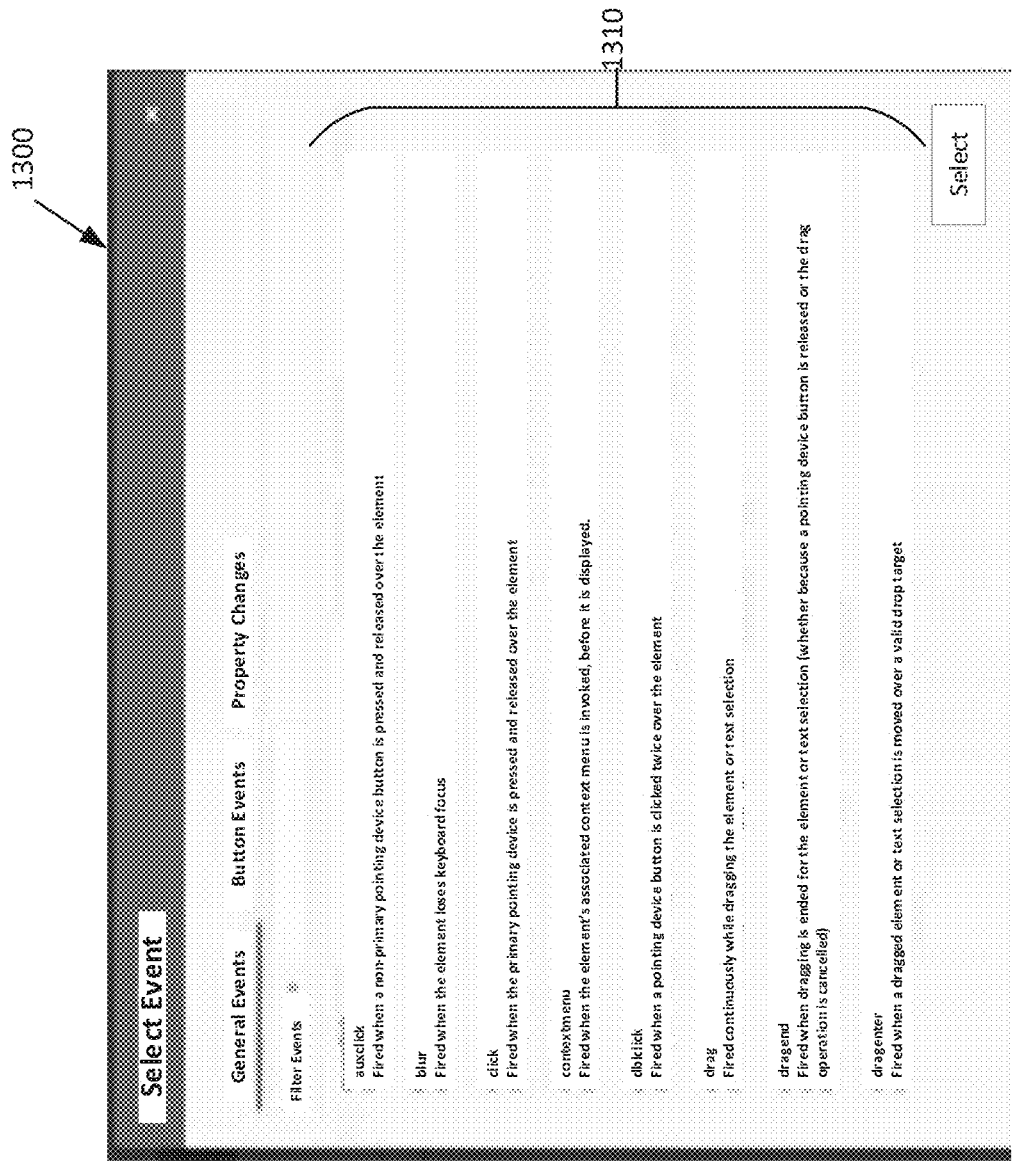
FIG. 13 depicts a web page that includes a list of events, according to one embodiment.

FIG. 13 depicts a web page 1300 that includes a list of events 1310, according to one embodiment. If the developer selects the action tab 1230 depicted in the page 1200, the list of events 1310, as depicted in FIG. 13, will be displayed in response. The developer can select one of the events displayed in FIG. 13 to bind to the UI component, such as the representation of the button 1221, displayed in the middle pane 1220.

In addition, the developer can click on a representation of a UI component, such as the button 1221, to display properties for that UI component.

If the developer clicks on the action tab 1230 in the page 1200 in FIG. 12, the list of events 1310 depicted in FIG. 13 is displayed in response. The developer can select one of the events in the displayed list 1310 to bind to the UI component, which in this illustration was a button 1221 that the developer previously selected from web page 1200 (FIG. 12).

The list of events 1310 includes events such as unclick that is fired when a non-primary pointing device button is pressed and released over an element, blur that is fired when the element loses keyboard focus, click that is fired when the primary pointing device button is pressed and released over the element, context menu that is fired when the element's associated context menu is invoked, before it is displayed, double click (also referred to as "dblclick") that is fired when a pointing device button is clicked twice over the element, drag that is fired continuously while dragging the element or a text selection, drag end that is fired when dragging is ended for the element or a text selection (whether because a pointing button is released or the drag operation is cancelled), and dragenter that is fired when a dragged element or text selection is moved over a valid drop target.

Referring to FIG. 4, although the tool's user interface 411 was illustrated in the context of creating a button for the client application 450's user interface 452, embodiments are well suited for other types of user interface controls, such as drop down menus, tabs, menus, radio buttons, lists and so on. An action chain can be triggered directly or indirectly as the result of a user interacting with a user interface control, as discussed herein.

Figure 14:
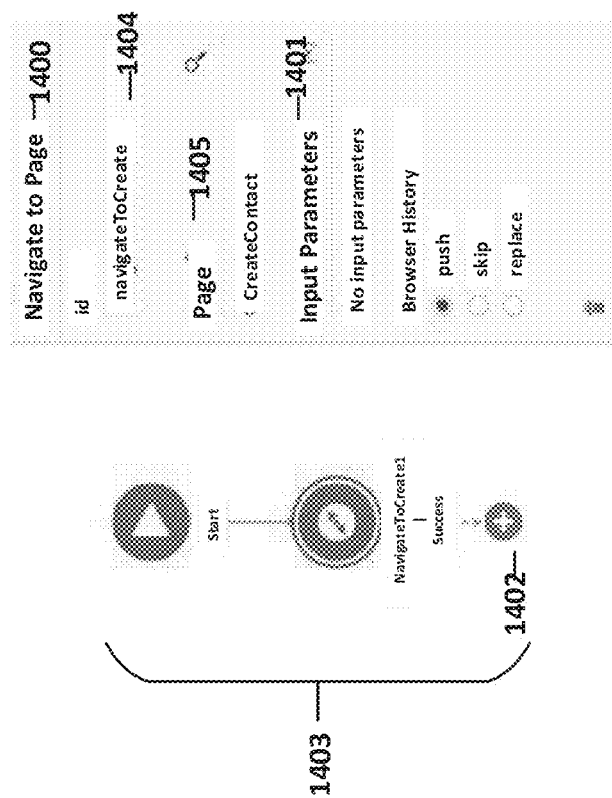
FIG. 14 depicts a property inspector for specifying input parameters, according to one embodiment.

FIG. 14 depicts a property inspector 1400 for specifying input parameters 1401, according to one embodiment. The property inspector 1400 enables the user to provide an identifier (ID) 1404 and a page 1405.

For action chains that the developer might want to use in multiple pages of the application being created. For example, when navigating to the start page, the developer can create an action chain that is application-scoped.

When the developer adds a Navigate to Page action to an action chain 640 (FIG. 6), 1403 (FIG. 14) the developer can specify an input parameter 1401 (FIG. 14) to specify the id of a record. To add a Navigate to Page action to an action chain the developer can:

1. Open the Actions editor for Page.
2. Click the action chain in the list to open it in the Action Chain editor.
3. Drag Navigate to Page icon 672 (FIG. 6) from the Actions palette into the action chain 640 (FIG. 6), 1403 (FIG. 14).

The developer can drag the action onto the Add icon (+) 681 (FIG. 6), 1402 (FIG. 14) in the action chain 640 (FIG. 6), 1403 (FIG. 14), and typically this action will be the final action in the chain. The Property Inspector 1400 opens in the editor when the developer adds the Navigate to Page action to the action chain.

Figure 15:
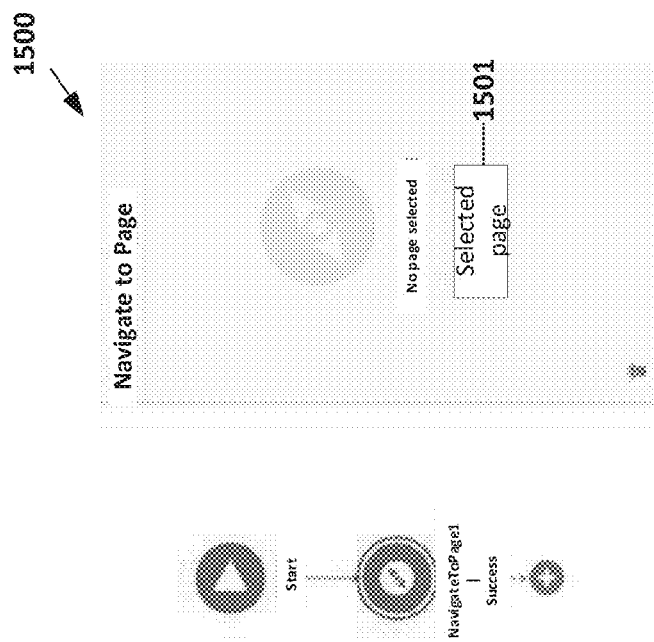
FIG. 15 depicts the property inspector with a select page button, according to one embodiment.

FIG. 15 depicts the property inspector 1500 with a select page button 1501, according to one embodiment.

Click Select Page button 1501 in the Property Inspector 1500.

Figure 16:
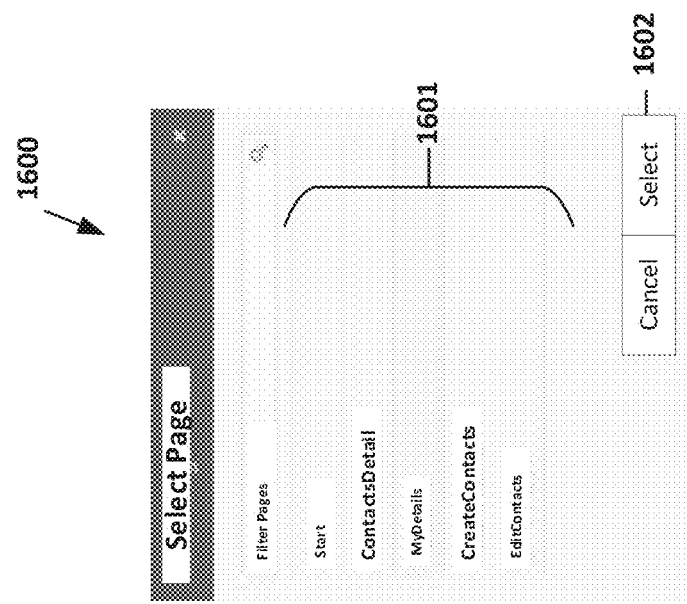
FIG. 16 depicts a select page dialog box that displays a list of the pages in the client application the developer is creating, according to one embodiment.

FIG. 16 depicts a select page dialog box 1600 that displays a list of the pages 1601 in the application 440 (FIG. 4) the developer is creating, according to one embodiment. The dialog box 1600 is displayed in response to the developer clicking on the select page button 1501 in the property inspector 1500 (FIG. 15).

Select a page in the list 1601. Click Select button 1602. If the page the developer selects has an input variable the developer can map a page variable to the action's Input Parameter.

Figure 17:
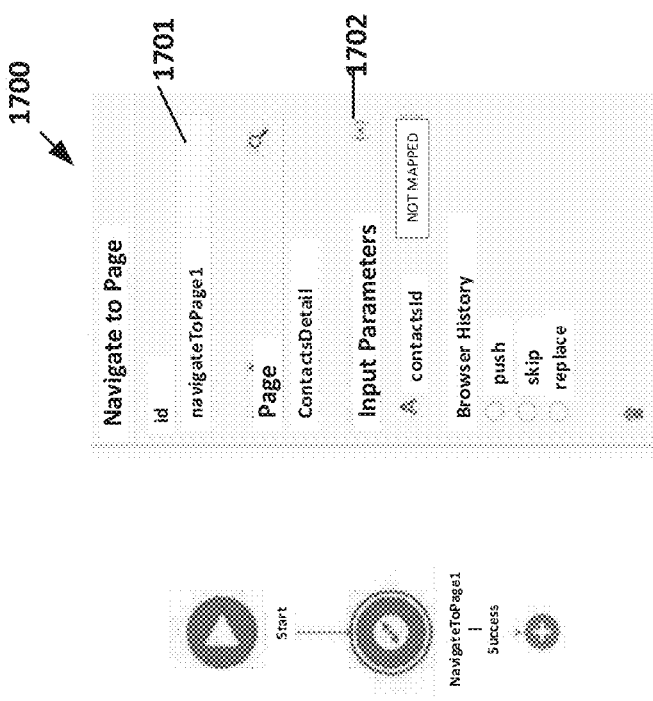
FIG. 17 depicts the property inspector for specifying a name for an action, according to one embodiment.

FIG. 17 depicts the property inspector 1700 for specifying a name for an action, according to one embodiment.

Type a name for the action in the Id field 1701 in the Property Inspector 1700. When the action is selected on the canvas, the developer can edit the action's properties in the Property Inspector.

Optional: If the page uses input parameters, click the Arrow icon (+) 1702 for Input Parameters and map the page variable for the input value to the action's parameter. Click Save.

Figure 18:
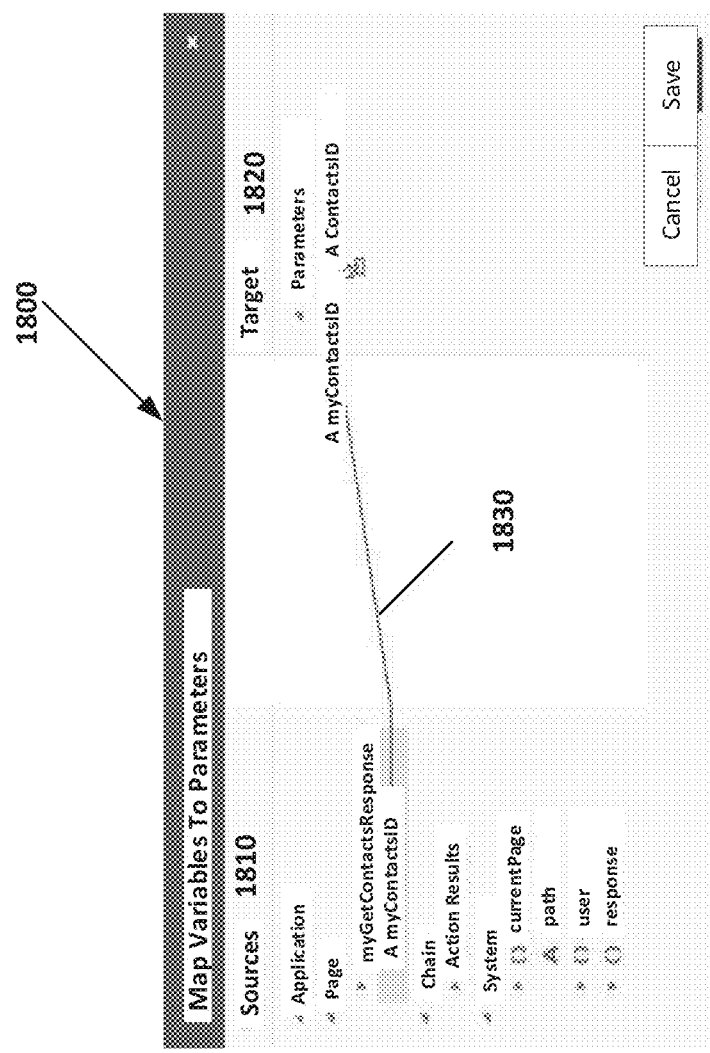
FIG. 18 depicts a map variables to parameters dialog box, according to one embodiment.

FIG. 18 depicts a map variables to parameters dialog box 1800, according to one embodiment. In the Map Variable to Parameters dialog box 1800, the developer can map Sources to Targets by dragging a variable in the Sources panel 1810 onto the Parameter in the Target panel 1820. The developer can click the parameter name to view the expression for the mapped variable. The line 1830 represents the mapping that is created between the myContactsID in the source panel 1810 and the contactID in the target panel 1820. Although the mapping, as depicted, is between myContactsID and contactID, embodiments are well suited to map other variables to other parameters.

If a suitable variable does not exist, the developer can create the variable in the Variables editor and edit the action later.

Optional: Specify any other parameters that may be used for the action.

With respect to navigate to page action (see icon 672 in FIG. 6): the action module for this action is "vb/action/builtin/navigateToPageAction". This action will navigate the client application's UI 442 (FIG. 4) and perform any parameter passing to activate that page. According to one embodiment, parameters for this action are as follows:

| Parameters: | |
|---|---|
| Parameter Name | Description |
| page | The page path (as defined in the page model) of the page to navigate to (required) |
| params | A key/value pair map that will be used to pass parameters to a page (optional) |
| history | Define the effect on the browser history. Allowed value are 'replace', 'skip' or 'push'. If the value is 'replace', the current browser history entry is replaced, meaning that back button will not go back to it. If the value is 'skip', the URL is not modified. (optional and default is 'push') |

Page parameters are the same as variables that are marked input, according to one embodiment. When calling this action, it doesn't matter if the destination page's variables is passed internally or via the URL. The framework will arrange that the parameters end up in the right place and are passed to the destination page.

The following code can be entered via the UI 411 and become part of code 441:

```
"myActionChain": {
"root": "myAction",
"actions": {
"myAction": {
"module": "vb/action/builtin/navigateToPageAction",
"parameters": {
"page": "myOtherPage",
"params": {
"id": "{{ $page.variables.myId }}"
}
}
}
}
}
```

This returns the outcome 'success' if there was no error during navigation. If navigation completed successfully, returns the action result true, otherwise false. Returns the outcome 'fail' with the error in the payload if there was an error.

Illustration of Methods

Figure 19:
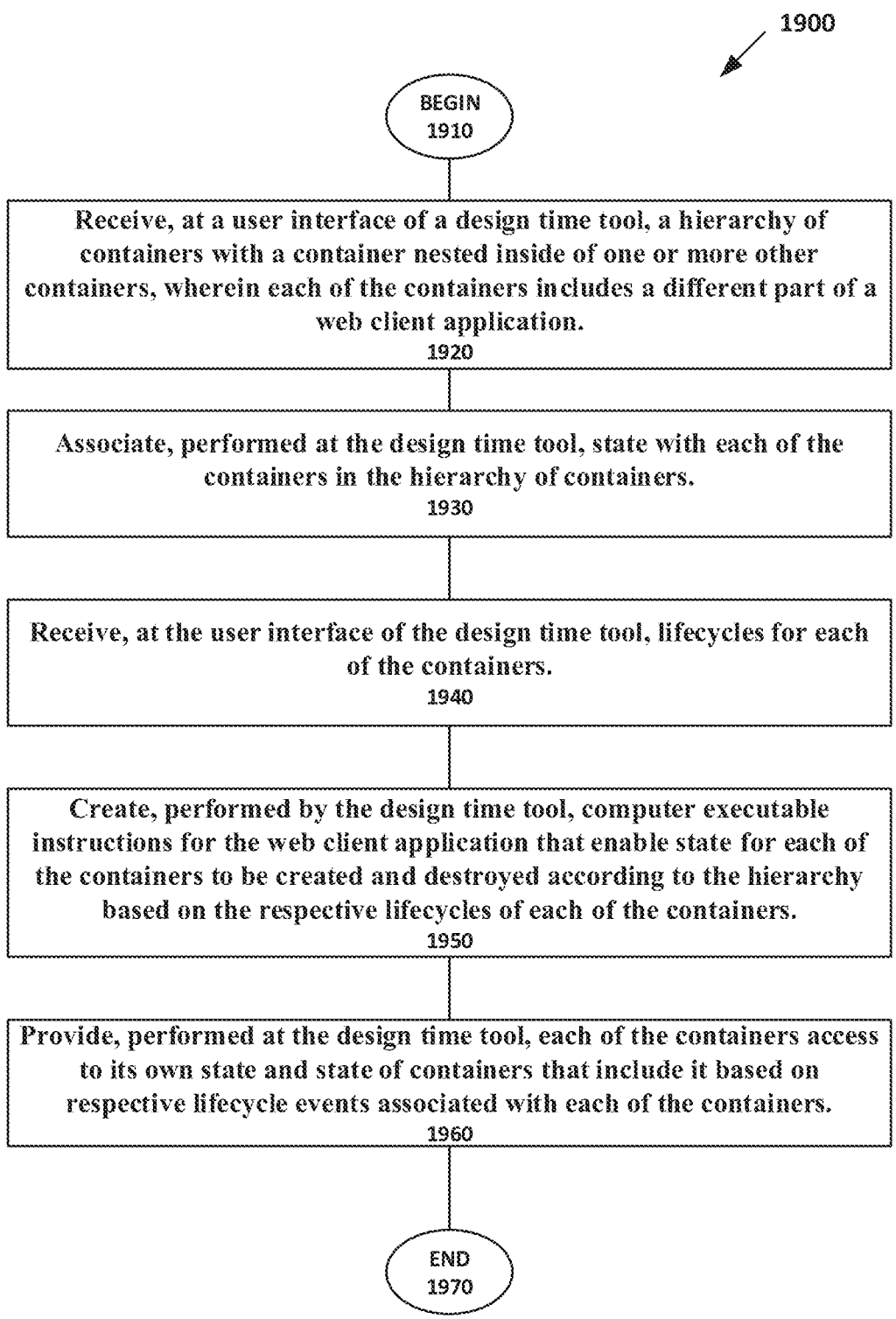
FIG. 19 depicts a flowchart for a method of providing state management persistence, according to one embodiment.

FIG. 19 depicts a flowchart for a method of providing state management persistence, according to one embodiment.

At 1910, the method 1900 begins.

At 1920, receive, at a user interface of a design time tool, a hierarchy of containers with a container nested inside of one or more other containers, wherein each of the containers includes a different part of a web client application.

For example, an unsophisticated developer can enter a hierarchy of containers 200 (FIG. 2) into a user interface 411 of a design time tool 410. Each of the containers in the hierarchy of containers 200 is nested inside of one or more other containers in a manner that each of the containers includes a different part of the web client application 440.

At 1930, associate, performed at the design time tool, state with each of the containers in the hierarchy of containers.

For example, an unsophisticated developer can enter variables 321, 351 (FIG. 3) into the tool's UI 411 and the tool 410 (FIG. 4) can associate the variables 321, 351 (FIG. 3) with the respective containers 310, 340 (FIG. 3).

At 1940, receive, at the user interface of the design time tool, lifecycles for each of the containers.

For example, the unsophisticated developer can enter lifecycles 323, 353 (FIG. 3), into the design time tool 410's user interface 411 (FIG. 4) for each of the containers depicted in FIG. 2.

At 1950, create, performed by the design time tool, computer executable instructions for the web client application that enable state for each of the containers to be created and destroyed according to the hierarchy based on the respective lifecycles of each of the containers.

For example, computer executable instructions 441 is created for the web client application 440 that enable state 321, 351 for each of the containers, depicted in FIG. 2, to be created and destroyed according to the hierarchy 200 based on the respective lifecycles 323, 353 of each of the containers, as discussed herein.

More specifically, according to one embodiment, the hierarchy paths correspond with URLs that a user can enter into a browser to display pages for a user interface of the client application 440. For example, referring to FIGS. 1, 2 and 4, the hierarchy path 261 corresponds with URL 130 that specifies "/SaaSCloud/Financials/receipts." When a user enters the URL 130 into a browser, the first backslash 100 would cause computer executable instructions in code 441 to start the application container 210. The SaaSCloud part 101 of the URL 130 would cause the computer executable instructions in code 441 start the SaaSCloud Module container 220; the financials part 102 of the URL 130 would cause the computer executable instructions in code 441 to start the financials module container 240; and the receipts part 133 of the URL 130 would cause computer executable instructions in code 441 to start the receipts page container 242 and load the corresponding receipts page. Similarly, the hierarchy path 262 corresponds to a URL 120 that specifies "/SaaSCloud/HumanResources/Employee," and hierarchy path 263 corresponds to a URL 110 that specifies "/SaaSCloud/Financials/ExpenseReport."

State for respective containers are created and destroyed based on the lifecycles associated with each of the containers. A developer can use the tool 410's design time user interface 411 to specify lifecycle events that trigger creation and destruction of state for the respective containers. For example, the "beforeEnter" lifecycle event may trigger creation of the expense report page container 241's state 351 and the "beforeExit" lifecycle event may trigger destruction of the expense report page container 241's state 351. The lifecycle events that trigger creation of state may be different for containers. For example, creation of state for one container may be triggered by "beforeEnter" while creation of state for another container may be triggered by "Enter." Further, the lifecycle events that trigger destruction of state may be different for containers.

Further, the creation and destruction of the respective container states are performed in accordance with the hierarchy paths. For example, referring to FIGS. 1, 2, and 4, assume that a user enters the URL 110 "/SaaSCloud/Financials/ExpenseReport" into a browser of a computer communicating with the client application 440. The backslash 100 would start the application container 210. Creation of the application container 210's state 321 is triggered in response to the lifecycle event that a developer specified using the design time user interface 411. The "SaaSCloud" part 101 of the URL 110 would start the SaaSCloud module container 220. Creation of the SaaSCloud module container 220's state 321 is triggered in response to the lifecycle event that the developer specified for container 220 using the design time user interface 411. Similarly, creation of the respective states 321, 351 for the financials module container 240 and the expense report page container 241 are triggered in response to the lifecycle events that the developer specified for those respective containers 240, 241. Now assume that the user enters the URL 120 "/SaasCloud/HumanResources/Employee" into the browser. The destruction of state 351 of the expense report page container 241 and the state 321 of the financials container 240 will be triggered in response to the lifecycle events that the developer specified for those respective containers 241, 240 using the design time user interface 411. Then creation of the states 321, 351 of the human resource module container 230 and the employee page container 231 will be triggered in response to the lifecycle events that the developer specified for those respective containers 230, 231. Since the hierarchy paths 262, 263 for these respective URLs 120, 110 both share the application container 210 and the SaaSCloud container 220, the states for the containers 210 and 220 will be preserved.

Containers can access the state of the containers that include them. For example, container 220 can access the state of container 210. Container 240 can access the state of containers 220 and 210. Container 241 can access the state of containers 240, 220, and 210. However, containers cannot access the state of containers that do not include them. For example, 240 and 241 cannot access the state of containers 230 and 231 and vice versa.

At 1960, provide, performed at the design time tool, each of the containers access to its own state and state of containers that include it based on respective lifecycle events associated with each of the containers.

For example, container 220 can access the state of container 210. Container 240 can access the state of containers 220 and 210. Container 241 can access the state of containers 240, 220, and 210. However, containers cannot access the state of containers that do not include them. For example, containers 240 and 241 cannot access the state of containers 230 and 231 and vice versa.

Further, the containers can access these states based on their respective lifecycle events. For example, container 241 can access its state and the state of the containers that include it up until a developer specified lifecycle event, such as "beforeExit," or "canExit," occurs, as discussed herein.

At 1970, the method ends

An embodiment provides for receiving, at the user interface, specification of a first event in a first lifecycle for a first container; associating the first event with creation of state for the first container; receiving, at the user interface, specification of a second event in a second lifecycle of a second container; and associating the second event with creation of state for the second container.

For example, an embodiment provides for receiving, at the user interface 411, specification of a first event, such as "beforeEnter," in a first lifecycle 353 for a first container 241; associating the first event with creation of state 351 for the first container; receiving, at the user interface, specification of a second event, such as "Enter," in a second lifecycle 353 of a second container 242; and associating the second event with creation of state for the second container. The lifecycle events that trigger creation of state may be different for containers. For example, creation of state for one container may be triggered by "beforeEnter" while creation of state for another container may be triggered by "Enter." Further, the lifecycle events that trigger destruction of state may be different for containers.

An embodiment provides for wherein the first event and the second event are different types of events. Continuing the example, the first event may be "beforeEnter," which is different from the second event "Enter." Both of these events may trigger creation of state but for different containers 241, 242.

An embodiment provides for receiving, at the user interface, specification of a first event in a first lifecycle for a first container; associating the first event with destruction of state for the first container; receiving, at the user interface, specification of a second event in a second lifecycle of a second container; and associating the second event with destruction of state for the second container. For example, an embodiment provides for receiving, at the user interface 411, specification of a first event, such as "beforeExit," in a first lifecycle 353 for a first container 241; associating the first event with destruction of state 351 for the first container 241; receiving, at the user interface, specification of a second event, such as "canExit," in a second lifecycle 353 of a second container 242; and associating the second event with destruction of state 351 for the second container 242. The "beforeExit" lifecycle event may trigger destruction of state for the expense report page container 241's state. While the "canExit" lifecycle event may trigger destruction of state for the receipts page 242.

An embodiment provides for wherein the first event and the second event are different types of events. Continuing the example, "beforeExit" and "canExit" are two different types of events.

An embodiment provides for in response to navigating from a first container to a second container during runtime of the web client application, wherein both the first container and the second container are included in a third container, wherein the navigating triggers a lifecycle event for the first container, destroying state of the first container; preserving state of the third container; creating state of the second container; and providing the second container access to the preserved state of the third container.

For example, an embodiment provides for in response to navigating from a first container 240 to a second container 230 during runtime of the web client application 210, wherein both the first container 240 and the second container 230 are included in a third container 220, wherein the navigating triggers a lifecycle event for the first container 240, destroying state of the first container 240; preserving state of the third container 220; creating state of the second container 230; and providing the second container 230 access to the preserved state of the third container 240. This is just one example, another example is a first container 220, a second container 250, and a third container application 210.

An embodiment provides for associating the containers with parts of a uniform resource locator (URL) pattern, wherein each part of the URL pattern is associated with one of the containers. FIG. 2 depicts containers that are associated with parts of URL patterns depicted in FIG. 1, as discussed here.

An embodiment provides for wherein each of the parts of the URL pattern maintain respective ones of the lifecycles. For example, a lifecycle 323, 353 (FIG. 3) is associated with each of the parts 100, 101, 102, 103 of the URL 110 (FIG. 1). A lifecycle is associated with each part of each URL.

An embodiment provides for executing a subset of the containers in accordance with a hierarchy paths associated with the URL pattern; creating variables for containers based on the URL pattern; and destroying variables for the containers based on the URL pattern.

For the sake of illustration assume that the hierarchy path is 263. The subset of containers that are associated with that hierarchy path 263 is 241, 240, 220, and 210. Variables are created for each of the containers as execution proceeds from outside to inside along the hierarchy path 263. For example, variables are created for 210, then 220, then 240, and then 241 based on URL 110. Those variables are destroyed for each of the containers as execution proceeds from inside to outside along the hierarchy path 263 based on the URL 110. For example, variables are destroyed for 241, 240, 220, and then 210.

An embodiment provides for providing a particular container access to variables of the particular container and to variables for containers that include the particular container according to a hierarchy path for the particular container. For example, container 242 has access to its variables as well as variables for containers 240, 220, and 210 (FIG. 2).

Figure 20:
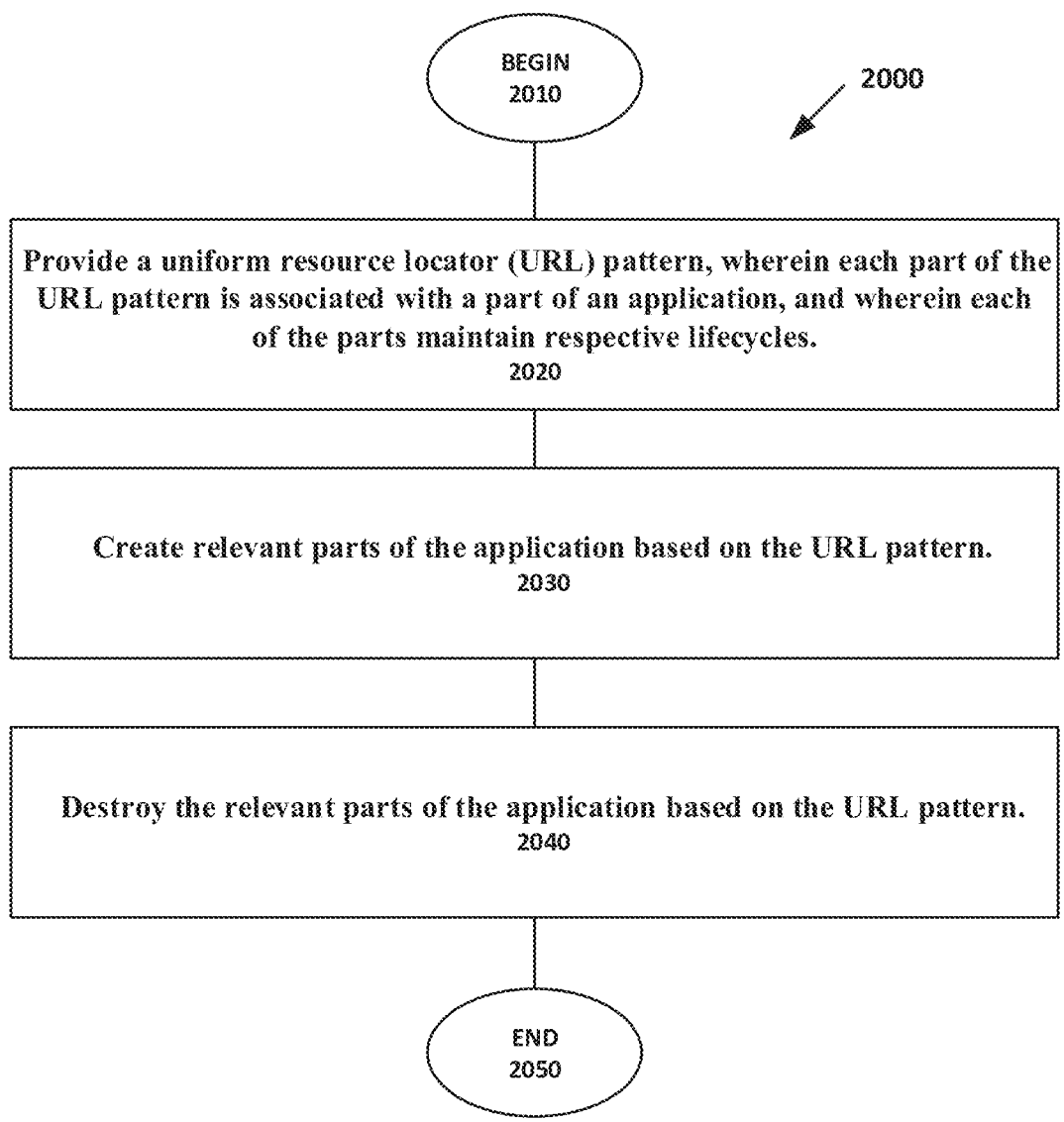
FIG. 20 depicts a flowchart for router configuration, according to one embodiment.

FIG. 20 depicts a flowchart for router configuration, according to one embodiment.

At 2010, the method begins.

At 220, a uniform resource locator (URL) pattern is provided. According to one embodiment, the hierarchy paths correspond with URLs that a user can enter into a browser to display pages in a user interface of the client application 440. For example, referring to FIGS. 1 and 2, hierarchy path 263 corresponds with URL 110; hierarchy path 262 corresponds with URL 120; and hierarchy path 261 corresponds with URL 130. More specifically, when a user enters the URL 130 into a browser, the backslash 100 would cause computer executable instructions in code 441 to start the application container 210; the SaaSCloud part 101 of the URL 130 would cause the computer executable instructions in code 441 to start the SaaSCloud Module container 220, the financials part 102 of the URL 130 would cause the computer executable instructions in code 441 to start the financials module container 240; and the receipts part 133 of the URL 130 would cause computer executable instructions in code 441 to start the receipts page container 242 and load the corresponding receipts page.

At 2030, relevant parts of the application are created based on the URL pattern. For example, referring to FIGS. 1 and 2, assume for the sake of illustration, that a user entered URL 110 into a browser of a computer communicating with the client application 440. The browser loads and displays the expense reports page that corresponds with the URL 110. The code 441 uses the lifecycles of the containers along the hierarchy path 263 that corresponds with the URL 110 to determine when to create and destroy variables for those containers.

For example, the variables for the application container 210 are created when the application 440 is entered in response to the browser detecting the backslash 100; the variables for the SaaSCloud Module container 220 are created when the SaaSCloud module is entered in response to the browser detecting the SaaSCloud 101 part of the URL 110; the variables for the financials module container 240 are created when the browser detects that the financials part 102 of the URL 110; and the variables for the expense reports page container 242 are created when the browser detects that the expense reports part 103 of the URL 110.

At 2040, relevant parts of the application 440 are destroyed based on the URL pattern. For example, assume that the user enters URL 120 (FIG. 1) into the browser of the computer communicating with the client application 440 (FIG. 4). Referring to FIG. 2, the variables for the receipt page container 242 and the financial module 240 are destroyed. The variables for the human resources container 230 and the employee page container 231 are created.

Each of the containers have their own respective lifecycles, according to one embodiment. Variables can be created and destroyed for example in response to phases of a lifecycle associated with containers. For example, the variables for a page can be created in response to the "beforeEnter" phase of the page's lifecycle and then destroyed in response to the "beforeExit" phase of that same page's lifecycle.

At 2050, the method for router configuration ends.

An embodiment provides for associating containers with parts of the URL pattern, wherein each of the parts of the URL has a separate container. For example, each of the containers depicted in FIG. 2 are associated with parts of URL patterns depicted in FIG. 1, as discussed herein.

An embodiment provides for providing each of the containers a respective hierarchy path that is defined by containers that include a particular container and order of containers including the particular container. For example, each of the containers depicted in FIG. 2 are associated with a hierarchy path 261-267. In a specific example, hierarchy path 263 for container 241 is defined by the containers 240, 220, 210 that include container 241 and the order of the containers including the particular container 241. In this illustration, the order of containers is that container 241 is inside of 240 which is inside of 220 which is inside of 210, An embodiment provides for providing the particular container access to its variables of the particular container and variables for containers along a hierarchy path of the particular container. For example, container 241 can access its own variables as well as the variables of containers 240, 220, and 210. Container 240 can access its variables as well as containers 220 and 210. But container 240 cannot access, for example, the variables of 241, 242, 230, 231, and so on.

In an embodiment, a lifecycle includes phases, wherein the phases include "beforeEnter" a page, "enter" a page, a page is "interactable", "canExit", which means a page can be exited, and "beforeExit" phase that occurs before exiting a page.

In an embodiment, phases are mutually exclusive. In other words, only one phase for a container's lifecycle can be operating at a time.

In an embodiment, at least one of the phases is an event for starting action chains.

An embodiment provides for receiving user input, at a design time tool, defining part of the application; and generating computer executable instructions for the application based on the input. For example, user input can be received by the design time tool 410's UI 411 and that input can be used for generating computer executable instructions 441.

An embodiment provides for executing the generated computer executable instruction during runtime of the application. For example, the generated computer executable instructions 441 are executed during runtime of the application 440.

Further, as can be seen, the destruction and creation of variables is related to the hierarchy paths. For example, variables are created for containers as execution moves from the outer most end to the inner most end of a hierarchy path and are destroyed for containers as execution moves from the innermost end to the outermost end of the hierarchy path.

Referring to FIGS. 1 and 2, the computer executable code that corresponds with a container has access to its variables and the variables for the containers along its hierarchy path. For example, the receipts page container 242 has access to its own variables and the variables for containers 240, 220, and 210 that are along the hierarchy path 261.

According to one embodiment, a container's lifecycle is associated with the part of a URL that corresponds with that container. For example, the lifecycle of receipts page container 242 is associated with the expense reports part 103 of URL 110; the lifecycle of the financials module container 240 is associated with the financials part 102 of URL 110; and so on.

The user interface for the router configuration is part of the tool's user interface 411. The router configuration user interface generates computer executable instructions, during design time, that become part of the code 441, which are executed during runtime of the client application.

Referring to FIG. 6, the first and second icons 671 and 672 under the navigate section 670 can be used for router configuration, in a manner discussed herein.

An action chain is a sequence of actions that the developer can create to define the behavior of components. Action chains are triggered by events such as click, onValueChanged and focus that the developer adds to page components. Action chains that are created in an "Actions Editor," as depicted in FIG. 6, can only be used within the context of a particular page that is being created.

Illustration of a System

Figure 21:
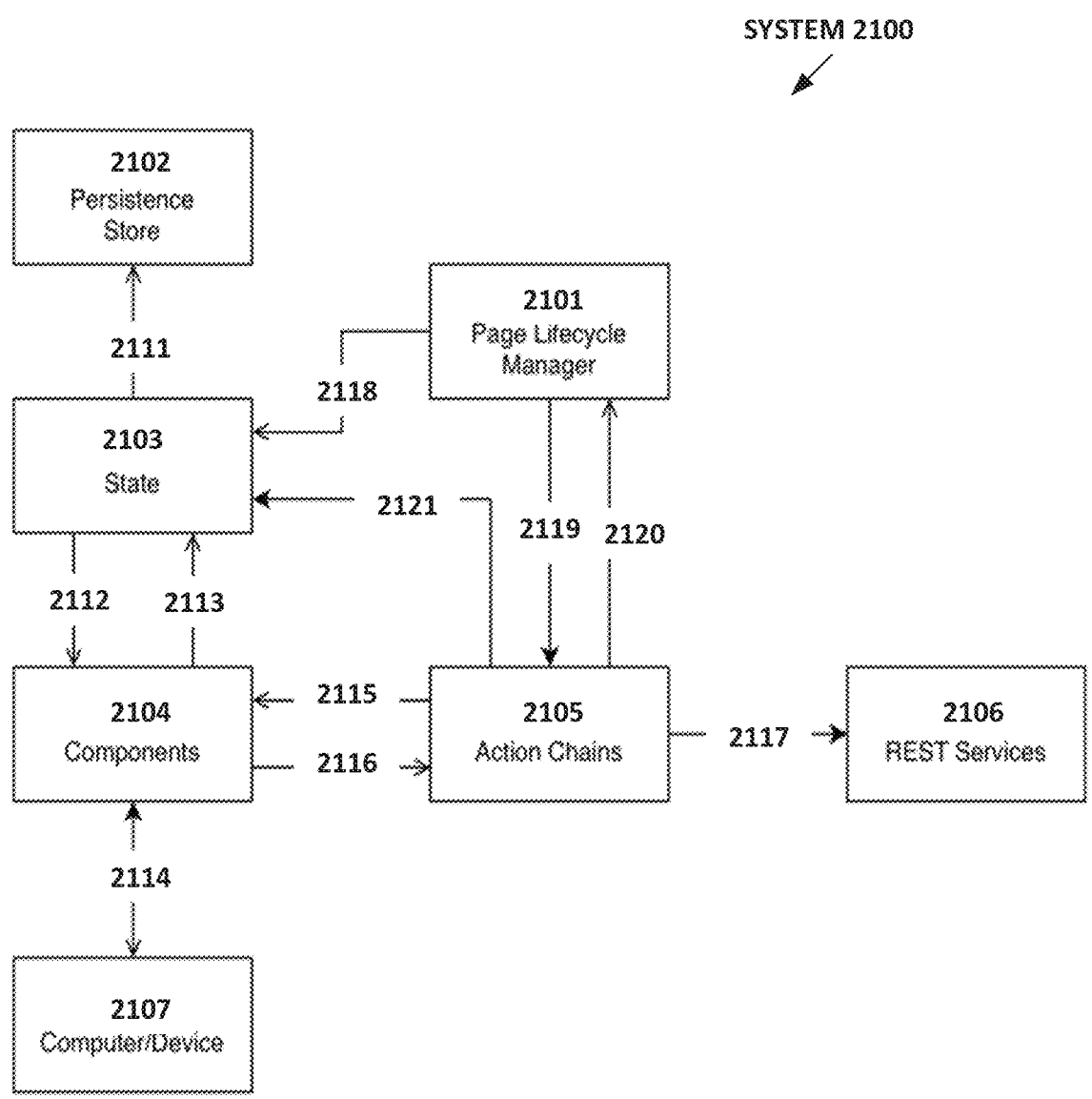
FIG. 21 depicts a system, according to one embodiment.

FIG. 21 depicts a system 2100, according to one embodiment.

The page lifecycle manager 2101 initializes and destroys parts of the state depending on which application UI is currently visible to the user. When it destroys state, it can save it to the persistence store (if configured) and when restoring state, it can load it from the persistence store.

Persistent Store 2102 is where application state is persisted (on disk) between invocations of the application by the user.

State 2103 provides the state in active use by the application (variables).

Components 2104 provides the UI that includes buttons, text, images, etc. that the user interacts with.

Action Chains 2105 provides the core flow of logic that drives the application (the processes).

Rest Services 2106 provides external REST APIs.

Computer/Device 2107 provides the browser or device that is controlling the UI.

The following is a description of the flow of operations 2111-2121 with respect to the entities 2101-2107 depicted in system 2100:

Operation 2111: The persistence store is used to initialize and save state between when the user is actively using the application.

Operation 2112: State changes are reflected on components. For example, a text field bound to some state).

Operation 2113: State changes can be triggered by components. For example, a text input updating state directly.

Operation 2114: The user interacts with the UI from their device 507.

Operation 2115: Action chains can call methods on the UI, such as telling a map to zoom.

Operation 2116: UI can fire action chains to perform logic (i.e. button click).

Operation 2117: Action chains are used to call REST services and to get data into and out of the system via those services.

Operation 2118: Page lifecycle manager initializes and destroys state as the user navigates the application and displayed different UI.

Operation 2119: Page lifecycle manager can fire action chains in response to navigation. For example, the user interacting with the device 2107 can cause a page to be entered and this can fire an action chain to do work in response to that.

Operation 2120: Action chains can cause navigation, such as activating different parts of the UI.

According to one embodiment, the user interface created by the system 2100 can be executed in the browser of a client computer/device 2107. The client computer/device that the created user interface executes may be the same client computer/device 2107 that was used to create the user interface or a different client computer/device. The created user interface can be executed on multiple client computer/devices at different times or simultaneously.

As discussed herein, a design time tool is used for creating the user interface. According to one embodiment, the JSON files are created as part of creating the user interface. The JSON files are transported to the browser of a client computer/device using a well-known method of communication and interpreted by runtime for execution.

With respect to Deferred State Mutation the execution flow, according to one embodiment is:

An action chain is invoked (typically by 2116). An action chain copies state via 2121. When the action chain completes, it merges the state back also by 2121.

With respect to State Management Persistence the execution flow, according to one embodiment is:

When a piece of UI is entered (though 2116 and 2120), the Page Lifecycle Manager (2101) will initialize state (2118), which can reference the persistence store (2111) to initialize that state.

With respect to Router Configuration the execution flow, according to one embodiment is:

When a piece of UI is entered (through 2116 and 2120), the Page Lifecycle Manager will initialize state via 2118 according to the pieces of UI shown.

According to one embodiment, a router is implemented in action chains 2105, depicted in FIG. 21, by an action called navigate to page action. The router uses the URL to map the relationship of variables (also referred to as "state") for containers to the parts of the URL, as discussed herein.

Example Computer Environment

Figure 22:
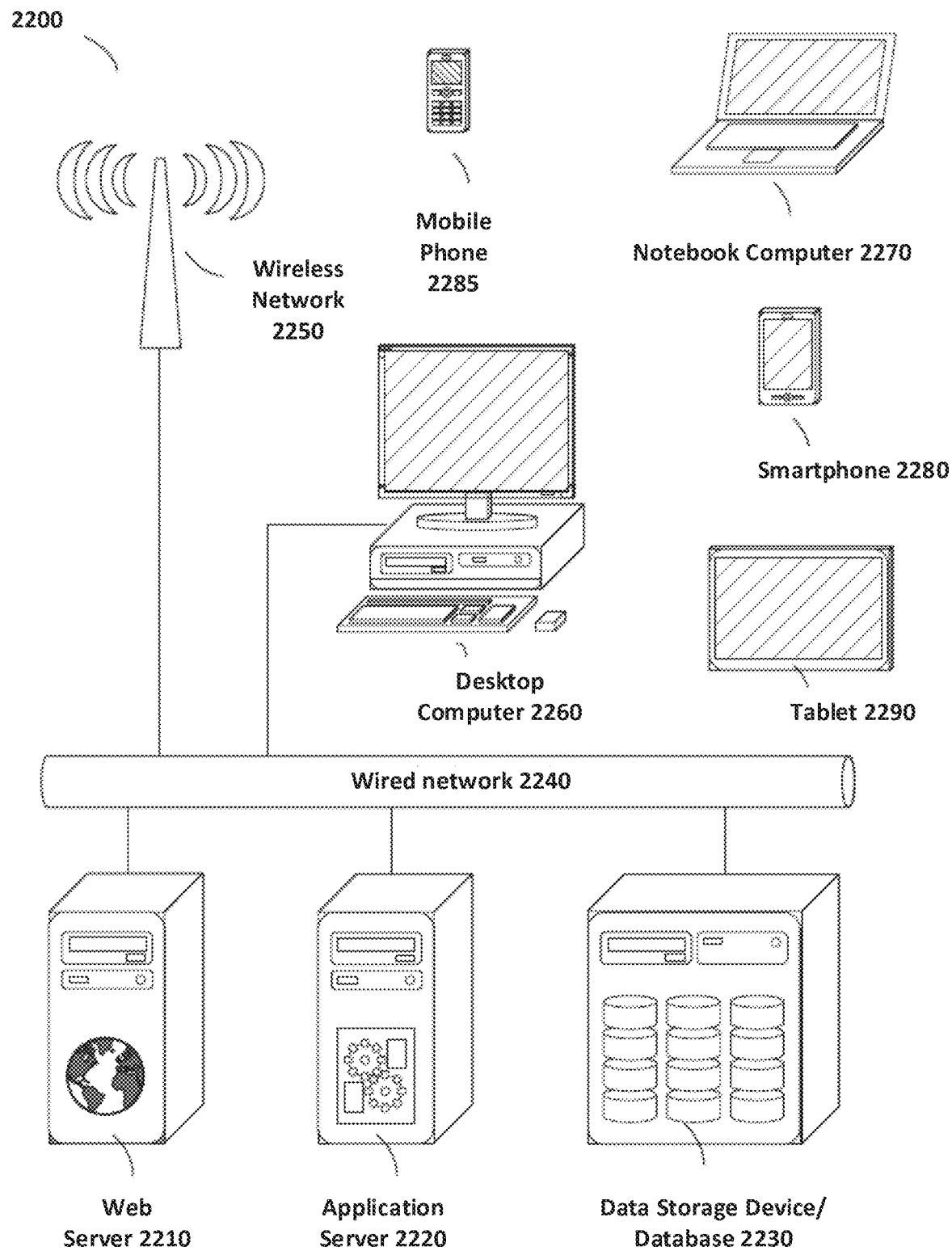
FIG. 22 is a general block diagram of a system and accompanying computing environment usable to implement the embodiments of Figures depicted herein.

FIG. 22 is a general block diagram of a system 2200 and accompanying computing environment usable to implement the embodiments of Figures depicted herein. The example system 2200 can support or running various hardware and/or software modules and associated methods discussed with reference to FIG. 21. Note that certain embodiments may be implemented using one or more standalone applications (for example, residing in a user device) and/or one or more web-based applications implemented using a combination of client-side and server-side code.

The general system 2200 includes user devices 2260-2290, including desktop computers 2260, notebook computers 2270, smartphones 2280, mobile phones 2285, and tablets 2290. The general system 2200 can interface with any type of user device, such as a thin-client computer, Internet-enabled mobile telephone, mobile Internet access device, tablet, electronic book, or personal digital assistant, capable of displaying and navigating web pages or other types of electronic documents and UIs, and/or executing applications. Although the system 2200 is shown with five user devices, any number of user devices can be supported.

A web server 2210 is used to process requests from web browsers and standalone applications for web pages, electronic documents, enterprise data or other content, and other data from the user computers. The web server 2210 may also provide push data or syndicated content, such as RSS feeds, of data related to enterprise operations.

An application server 2220 operates one or more applications. The applications can be implemented as one or more scripts or programs written in any programming language, such as JAVA™, C, C++, C#, or any scripting language, such as JAVASCRIPT™ or ECMAScript (European Computer Manufacturers Association Script), Perl, PHP (Hypertext Preprocessor), Python, Ruby, or TCL (Tool Command Language). Applications can be built using libraries or application frameworks, such as Rails, Enterprise JavaBeans, or .NET. Web content can be created using HTML (HyperText Markup Language), CSS (Cascading Style Sheets), and other web technology, including templating languages and parsers.

The data applications running on the application server 2220 are adapted to process input data and user computer requests and can store or retrieve data from data storage device or database 2230. Database 2230 stores data created and used by the data applications. In an embodiment, the database 2230 includes a relational database that is adapted to store, update, and retrieve data in response to SQL format commands or other database query languages. Other embodiments may use unstructured data storage architectures and NoSQL (Not Only SQL) databases.

In an embodiment, the application server 2220 includes one or more general-purpose computers capable of executing programs or scripts. In an embodiment, web server 2210 is implemented as an application running on the one or more general-purpose computers. The web server 2210 and application server 2220 may be combined and executed on the same computers.

An electronic communication network 2240-2250 enables communication between user computers 2260-2290, web server 2210, application server 2220, and database 2230. In an embodiment, networks 2240-2250 may further include any form of electrical or optical communication devices, including wired network 2240 and wireless network 2250. Networks 2240-2250 may also incorporate one or more local-area networks, such as an Ethernet network, wide-area networks, such as the Internet; cellular carrier data networks; and virtual networks, such as a virtual private network.

The system 2200 is one example for executing applications according to an embodiment of the invention. In another embodiment, web server 2210, application server 2220, and optionally database 2230 can be combined into a single server computer application and system. In a further embodiment, virtualization and virtual machine applications may be used to implement one or more of the web servers 2210, application server 2220, and database 2230.

In still further embodiments, all or a portion of the web and application serving functions may be integrated into an application running on each of the user computers. For example, a JAVASCRIPT™ application on the user computer may be used to retrieve or analyze data and display portions of the applications.

In a particular example embodiment, the user computing devices 260-2290 run browsers, e.g., used to display the user interfaces. User interface may be viewed from a client computing device, such as a desktop computer 2260, notebook computer 2270, smartphone 2280, mobile phone 2285, tablet 2290, of FIG. 22 and/or other computing devices.

In a particular example embodiment, browsers of the desktop computer 2260, notebook computer 2270, smartphone 2280, mobile phone 2285, tablet 2290 of FIG. 2 connect to the Internet, represented by the wired network 2240 and/or wireless network 2250 as shown in FIG. 22, to access one or more network-coupled servers, databases, and/or associated cloud-based functionality, as represented by the modules of FIG. 21. For example, one or more entities 2101, 2104, 2105, and 2106 can reside on an application server 2220. The client computer/device 2107 may be implemented as one or more of user computing devices 2260-2290. One or more databases 2230 as shown in FIG. 22 may be used to host data, such as persistent store 2102 and state 2103, associated with FIG. 21. The networks used for FIG. 21 can be implemented as networks 2240. For example, according to one embodiment, a network 2240 can be used to communicate between the client computer/device 2107 and components 2104.

Referring to FIGS. 4 and 22, the network 470 can be a wireless network 2250, a wired network 2240, or can include both a wireless network 2250 and a wired network 2240. The hardware memory 420 and/or the database 430 can be implemented as a data storage device/database 2230. One or more applications 440, 450, 460 and the tool 410 can reside on and be executed by one or more web servers 2210 or application servers 2220. The pages of the UIs 411, 442 can be loaded and displayed by browsers executing in user computing devices 2260-2290. The client application 440 can be executed in or by tool 410. Tool 410 and application 440 can be executed on the same computer or on separate computers that communicate with each other.

Figure 23:
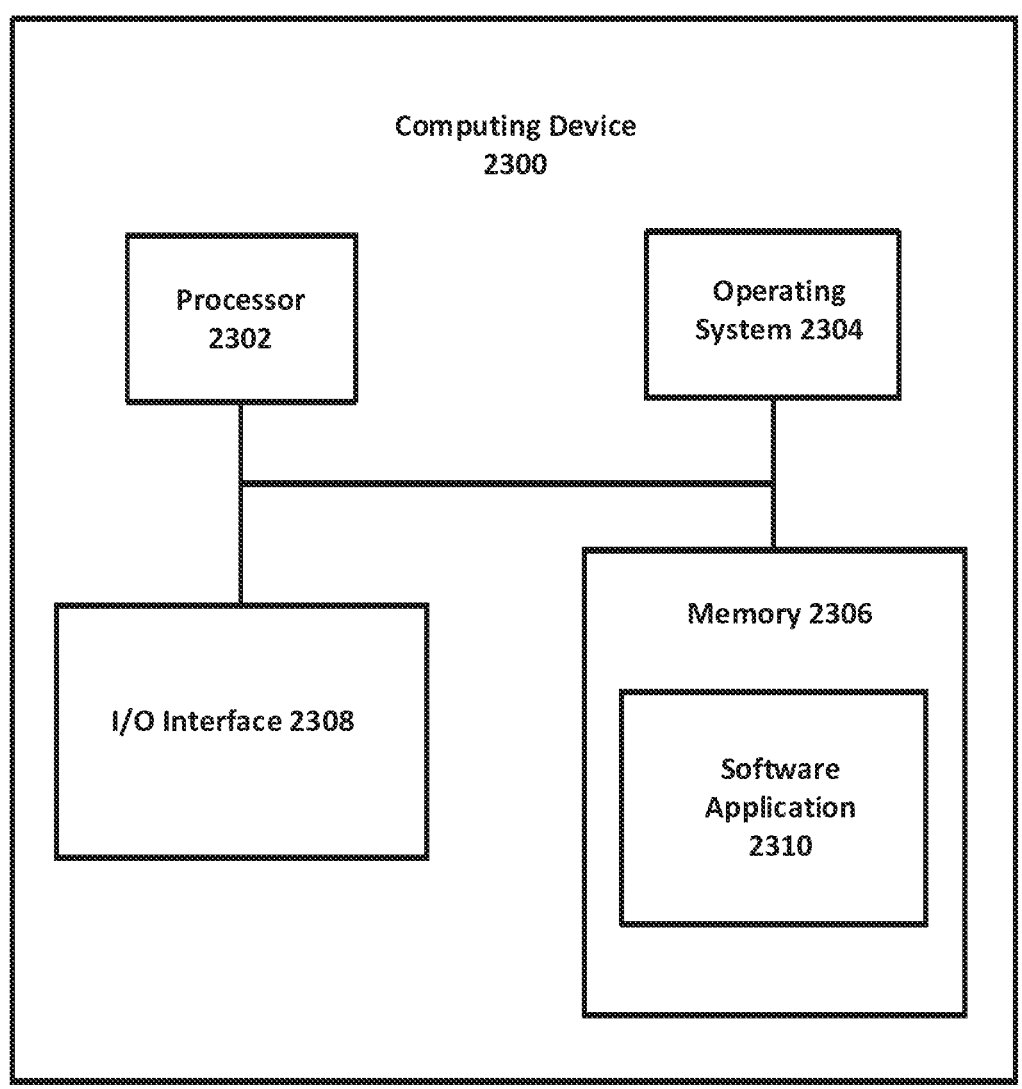
FIG. 23 is a general block diagram of a computing device usable to implement the embodiments described herein.

FIG. 23 is a general block diagram of a computing device 2300 usable to implement the embodiments described herein. While the computing device 2300 of FIG. 23 may be described as performing one or more of the steps in the embodiments herein, in other embodiments any suitable component or combination of components of the computing device 2300 or any suitable processor or processors associated with system 2300 may facilitate performing the steps.

FIG. 23 illustrates a block diagram of an example computing system 2300, which may be used for implementations described herein. For example, computing system 2300 may be used to implement user devices 2260-2290, and server devices 2210, 2220 of FIG. 22 as well as to perform the method implementations described herein. In some implementations, computing system 2300 may include a processor 2302, an operating system 2304, a memory 2306, and an input/output (I/O) interface 2308. In various implementations, processor 2302 may be used to implement various functions and features described herein, as well as to perform the method implementations described herein. While processor 2302 is described as performing implementations described herein, any suitable component or combination of components of system 2300 or any suitable processor or processors associated with system 2300 or any suitable system may perform the steps described. Implementations described herein may be carried out on a user device, on a server, or a combination of both.

Computing device 2300 also includes a software application 2310, which may be stored on memory 2306 or on any other suitable storage location or computer-readable medium. Software application 2310 provides instructions that enable processor 2302 to perform the functions described herein and other functions. The components of computing system 2300 may be implemented by one or more processors or any combination of hardware devices, as well as any combination of hardware, software, firmware, etc.

For ease of illustration, FIG. 23 shows one block for each of processor 2302, operating system 2304, memory 2306, I/O interface 2308, and software application 2310. These blocks 2302, 2304, 2306, 2308, and 2310 may represent multiple processors, operating systems, memories, I/O interfaces, and software applications. In various implementations, computing system 2300 may not have all the components shown and/or may have other elements including other types of components instead of, or in addition to, those shown herein.

A Computer Readable Medium and an Apparatus

Unless otherwise specified, any one or more of the embodiments described herein can be implemented using processor readable instructions which reside, for example, in non-transitory processor-readable storage device of a computer system or like device. The non-transitory processor-readable storage device can be any kind of physical memory that instructions can be stored on. Examples of the non-transitory processor-readable storage device include but are not limited to a disk, a compact disk (CD), a digital versatile device (DVD), read only memory (ROM), flash, and so on. As described above, certain processes and operations of various embodiments of the present invention are realized, in one embodiment, as a series of processor readable instructions (e.g., software program) that reside within non-transitory processor-readable storage device of a computer system and are executed by one or more processors of the computer system. When executed, the instructions cause a computer system to implement the functionality of various embodiments of the present invention. For example, the instructions can be executed by a processor. The processor is a hardware processor, such as a central processing unit, associated with the computer system. The non-transitory processor-readable storage device is hardware memory and the one or more processors are hardware processors. According to one embodiment, a non-transitory processor-readable storage device is a tangible physical device Conclusion Any suitable programming language can be used to implement the routines of particular embodiments including C, C++, JAVA®, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments. For example, a non-transitory medium such as a hardware storage device can be used to store the control logic, which can include executable instructions.

Particular embodiments may be implemented by using a programmed general purpose digital computer, by using application specific integrated circuits, programmable logic devices, field programmable gate arrays, optical, chemical, biological, quantum or nanoengineered systems, etc. Other components and mechanisms may be used. In general, the functions of particular embodiments can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

A "processor" includes any suitable hardware and/or software system, mechanism or component that processes data, signals or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems. Examples of processing systems can include servers, clients, end user devices, routers, switches, networked storage, etc. A computer may be any processor in communication with a memory. The memory may be any suitable processor-readable storage medium, such as random-access memory (RAM), read-only memory (ROM), magnetic or optical disk, or other non-transitory media suitable for storing instructions for execution by the processor.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A non-transitory processor-readable storage device storing instructions which when executed by a processor perform a method of providing state management persistence, the method comprising:
receiving, at a user interface of a design time tool, a hierarchy of containers with a first container nested inside of a second container, wherein each of the containers in the hierarchy includes a different executable part of a web client application;
associating, performed at the design time tool, state with each of the containers in the hierarchy of the containers;

receiving, at the user interface of the design time tool, lifecycles for each of the containers in the hierarchy, wherein the first container and the second container have different ones of the lifecycles;

creating, performed by the design time tool, computer executable instructions for the web client application that provide creation and destruction of state associated with each of the containers in the hierarchy that are created and destroyed according to an order and lifecycle events of the lifecycles, wherein the containers in the hierarchy are arranged in the order along—a path of the hierarchy of the containers and wherein each of the lifecycles correspond with one of the containers in the hierarchy;

providing, performed at the design time tool, the first container access to state of the first container, the second container access to state of the second container, and the first container access to the state of the second container based on lifecycle events that correspond with the first and second containers in the hierarchy, wherein the hierarchy of the containers includes a third container that is outside the first container and the second container, and wherein the first container and the second container do not access state of the third container; and creating and destroying the containers of the hierarchy, during runtime of the web client application, according to the order and lifecycle events.

2. The non-transitory processor-readable storage device as recited by claim 1, wherein the method further comprises:
receiving, at the user interface, specification of a first event in a first lifecycle for a fourth container;
associating the first event with creation of state for the fourth container;
receiving, at the user interface, specification of a second event in a second lifecycle of a fifth container; and
associating the second event with creation of state for the fifth container.

3. The non-transitory processor-readable storage device as recited by claim 2, wherein the first event and the second event are different types of events.

4. The non-transitory processor-readable storage device as recited by claim 1, wherein the method further comprises:
receiving, at the user interface, specification of a first event in a first lifecycle for a fourth container;
associating the first event with destruction of state for the fourth container;
receiving, at the user interface, specification of a second event in a second lifecycle of a fifth container; and
associating the second event with destruction of state for the fifth container.

5. The non-transitory processor-readable storage device as recited by claim 4, wherein the first event and the second event are different types of events.

6. The non-transitory processor-readable storage device as recited by claim 1, wherein the method further comprises:
in response to navigating from a fourth container to a fifth container during runtime of the web client application, wherein both the fourth container and the fifth container are included in a sixth container, wherein the navigating triggers a lifecycle event for the fourth container,
destroying state of the fourth container;
preserving state of the sixth container;
creating state of the fifth container; and
providing the fifth container access to the preserved state of the sixth container.

7. The non-transitory processor-readable storage device as recited by claim 1, wherein the method further comprises:
associating the containers with parts of a uniform resource locator (URL) pattern, wherein each part of the URL pattern is associated with one of the containers.

8. The non-transitory processor-readable storage device as recited by claim 7, wherein each of the parts of the URL pattern maintain respective ones of the lifecycles.

9. The non-transitory processor-readable storage device as recited by claim 7, wherein the method further comprises:
executing a subset of the containers in accordance with hierarchy paths associated with the URL pattern, wherein the path of the hierarchy is one of the hierarchy paths;
creating variables for the subset of the containers based on the URL pattern; and
destroying variables for the subset of the containers based on the URL pattern.

10. The non-transitory processor-readable storage device as recited by claim 9, wherein the method further comprises:
providing a particular container access to variables of the particular container and to variables for containers that include the particular container according to a hierarchy path for the particular container.

11. A method of providing state management persistence, the method comprising:
receiving, at a user interface of a design time tool, a hierarchy of containers with a first container nested inside of a second container, wherein each of the containers in the hierarchy includes a different executable part of a web client application;
associating, performed at the design time tool, state with each of the containers in the hierarchy of the containers;
receiving, at the user interface of the design time tool, lifecycles for each of the containers in the hierarchy, wherein the first container and the second container have different ones of the lifecycles;
creating, performed by the design time tool, computer executable instructions for the web client application that provide creation and destruction of state associated with each of the containers in the hierarchy that are created and destroyed according to an order and lifecycle events of the lifecycles, wherein the containers in the hierarchy are arranged in the order along—a path of the hierarchy of the containers and wherein each of the lifecycles correspond with one of the containers in the hierarchy;
providing, performed at the design time tool, the first container access to state of the first container, the second container access to state of the second container, and the first container access to the state of the second container based on lifecycle events that correspond with the first and second containers in the hierarchy, wherein the hierarchy of the containers includes a third container that is outside the first container and the second container, and wherein the first container and the second container do not access state of the third container; and
creating and destroying the containers of the hierarchy, during runtime of the web client application, according to the order and lifecycle events.

12. The method as recited by claim 11, wherein the method further comprises:
receiving, at the user interface, specification of a first event in a first lifecycle for a fourth container;

associating the first event with creation of state for the fourth container;

receiving, at the user interface, specification of a second event in a second lifecycle of a fifth container; and associating the second event with creation of state for the fifth container.

13. The method as recited by claim 12, wherein the first event and the second event are different types of events.

14. The method as recited by claim 11, wherein the method further comprises:

receiving, at the user interface, specification of a first event in a first lifecycle for a fourth container;

associating the first event with destruction of state for the fourth container;

receiving, at the user interface, specification of a second event in a second lifecycle of a fifth container; and associating the second event with destruction of state for the fifth container.

15. The method as recited by claim 14, wherein the first event and the second event are different types of events.

16. The method as recited by claim 11, wherein the method further comprises:

in response to navigating from a fourth container to a fifth container during runtime of the web client application, wherein both the fourth container and the fifth container are included in a sixth container, wherein the navigating triggers a lifecycle event for the fourth container, destroying state of the fourth container;

preserving state of the sixth container;

creating state of the fifth container; and providing the fifth container access to the preserved state of the sixth container.

17. The method as recited by claim 11, wherein the method further comprises:

associating the containers with parts of a uniform resource locator (URL) pattern, wherein each part of the URL pattern is associated with one of the containers.

18. The method as recited by claim 17, wherein each of the parts of the URL pattern maintain respective ones of the lifecycles.

19. The method as recited by claim 17, wherein the method further comprises:

executing a subset of the containers in accordance with hierarchy paths associated with the URL pattern, wherein the path of the hierarchy is one of the hierarchy paths;

creating variables for the subset of the containers based on the URL pattern; and destroying variables for the subset of the containers based on the URL pattern.

20. A system that provides state management persistence, comprising:

one or more processors; and a non-transitory processor-readable storage device storing instructions which when executed by a processor perform a method of providing state management persistence comprising:

receiving, at a user interface of a design time tool, a hierarchy of containers with a first container nested inside of a second container, wherein each of the containers in the hierarchy includes a different executable part of a web client application;

associating, performed at the design time tool, state with each of the containers in the hierarchy of the containers;

receiving, at the user interface of the design time tool, lifecycles for each of the containers in the hierarchy, wherein the first container and the second container have different ones of the lifecycles;

creating, performed by the design time tool, computer executable instructions for the web client application that provide creation and destruction of state associated with each of the containers in the hierarchy that are created and destroyed according to an order and lifecycle events of the lifecycles, wherein the containers in the hierarchy are arranged in the order along—a path of the hierarchy of the containers and wherein each of the lifecycles correspond with one of the containers in the hierarchy;

providing, performed at the design time tool, the first container access to state of the first container, the second container access to state of the second container, and the first container access to the state of the second container based on lifecycle events that correspond with the first and second containers in the hierarchy, wherein the hierarchy of the containers includes a third container that is outside the first container and the second container, and wherein the first container and the second container do not access state of the third container; and creating and destroying the containers of the hierarchy, during runtime of the web client application, according to the order and lifecycle events.

* * * * *